April 20, 1943. H. N. SEYFERTH 2,317,226
MACHINE TOOL
Filed Aug. 3, 1940 14 Sheets-Sheet 2

INVENTOR
Harold N. Seyferth
By Parker, Carlson, Pigue & Hubbard.
ATTORNEYS

April 20, 1943. H. N. SEYFERTH 2,317,226
MACHINE TOOL
Filed Aug. 3, 1940 14 Sheets-Sheet 3

INVENTOR
Harold N. Seyferth
By Parker, Carlson, Pitzner & Hubbard.
ATTORNEYS

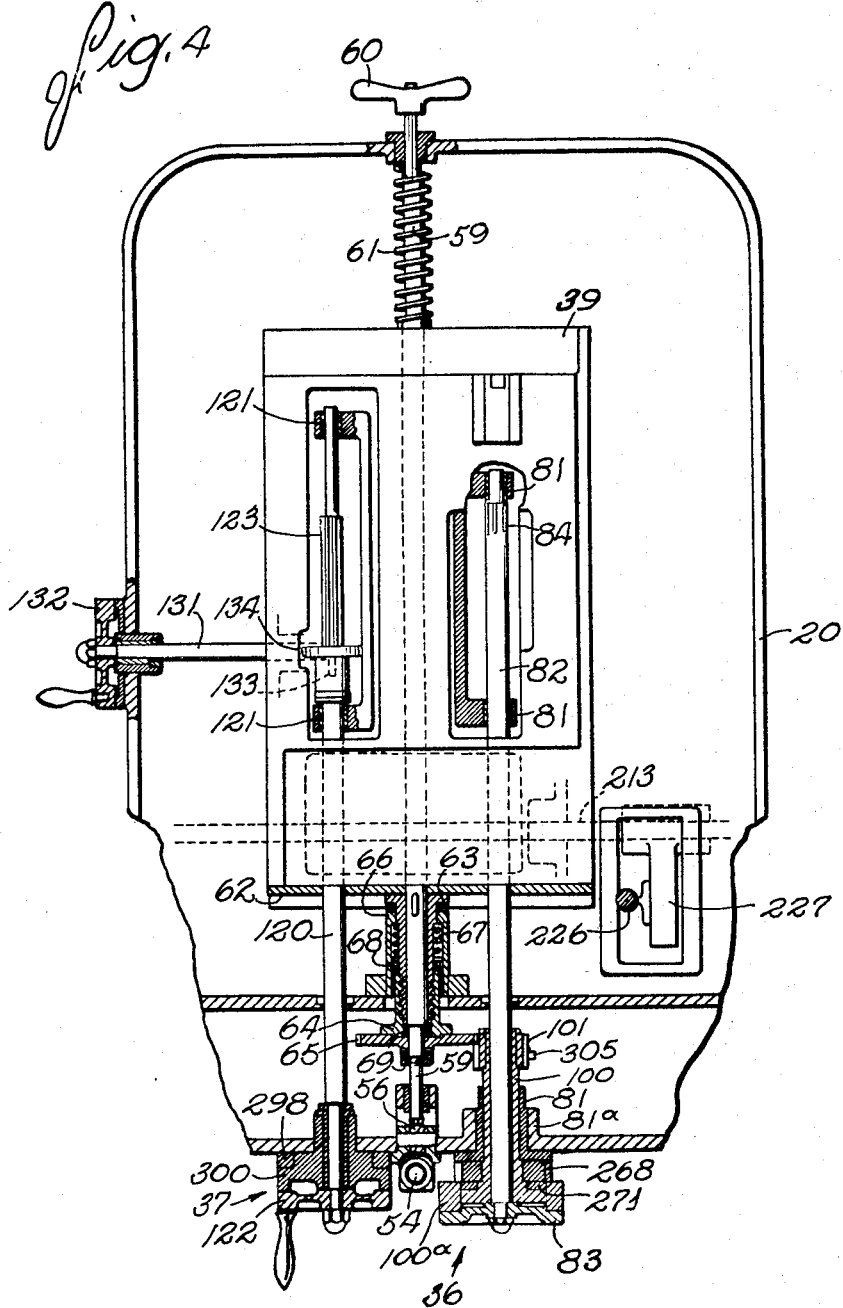

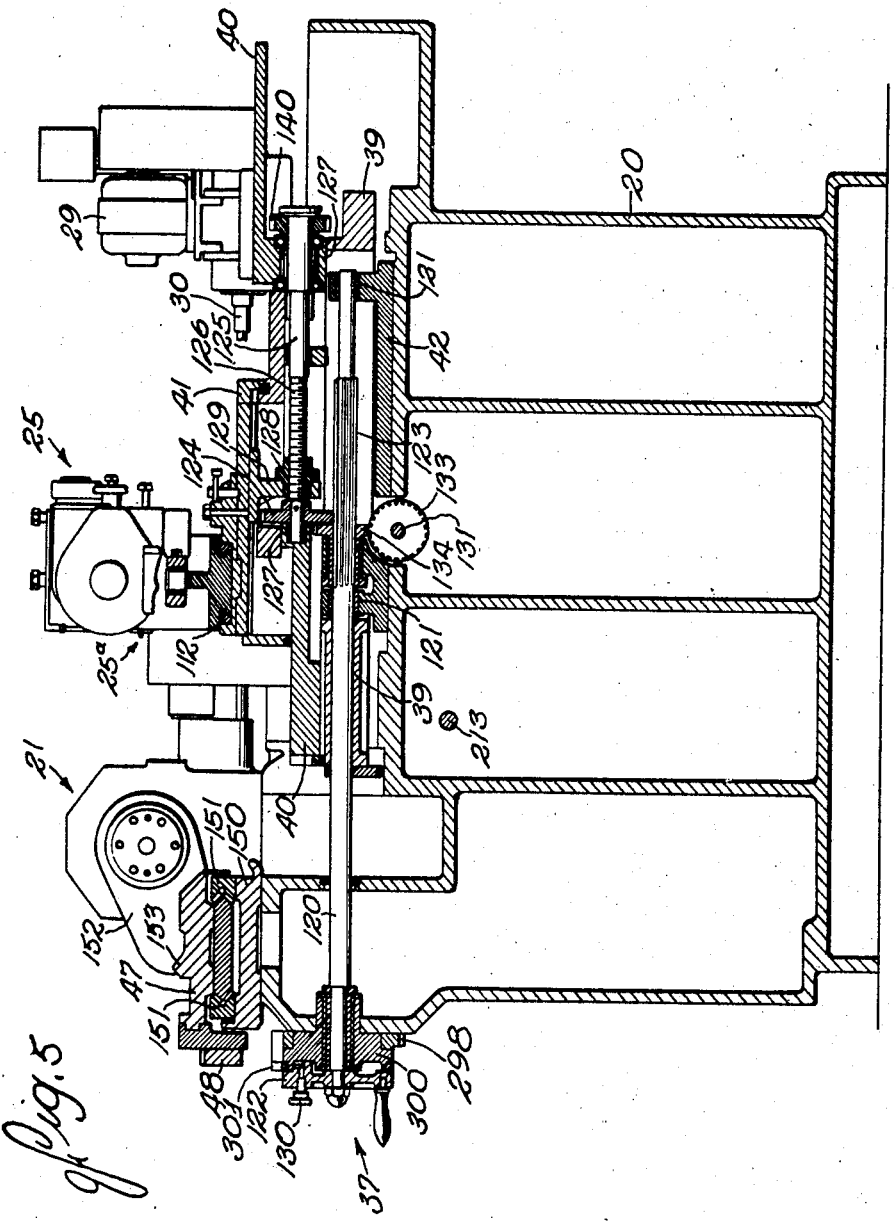

April 20, 1943. H. N. SEYFERTH 2,317,226
MACHINE TOOL
Filed Aug. 3, 1940 14 Sheets-Sheet 6
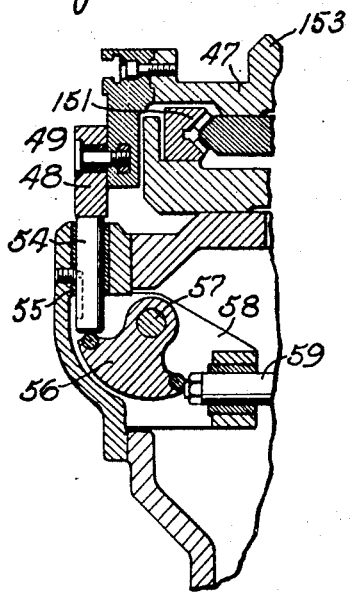
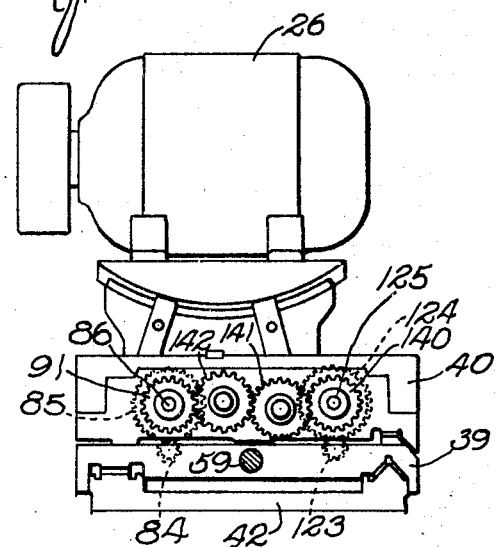
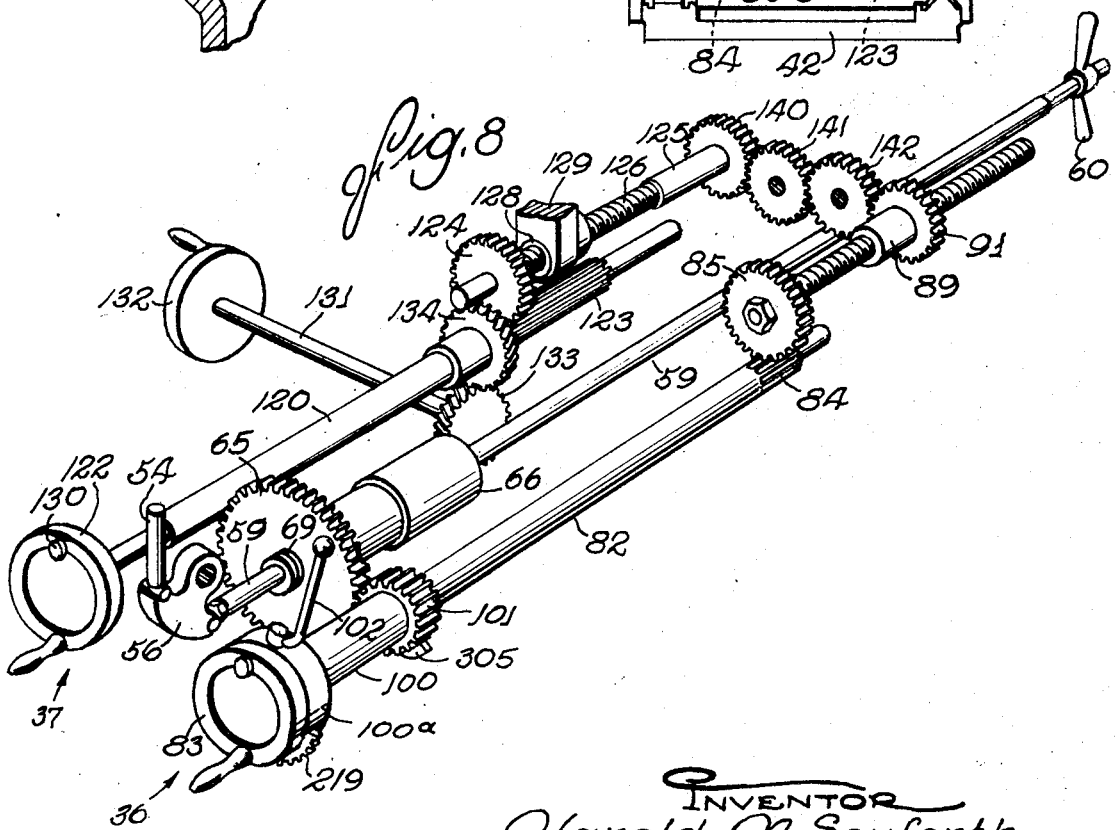
INVENTOR
Harold N. Seyferth
By Parker, Carlson, Pigman & Hubbard
ATTORNEYS April 20, 1943.   H. N. SEYFERTH   2,317,226
MACHINE TOOL
Filed Aug. 3, 1940   14 Sheets-Sheet 7
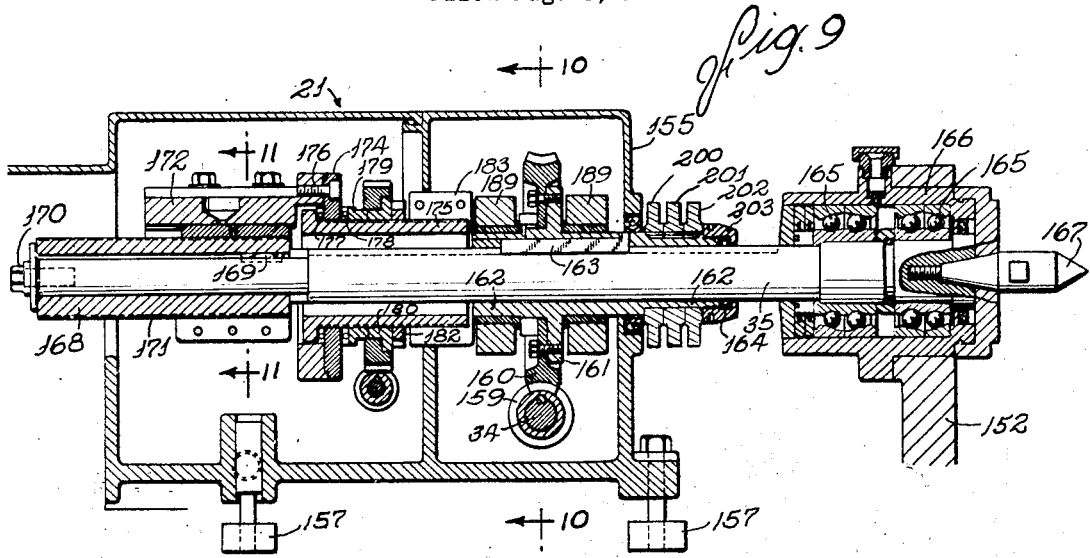
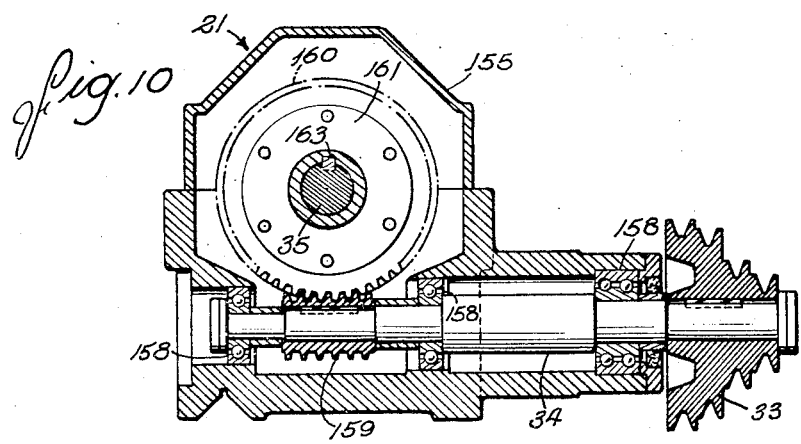
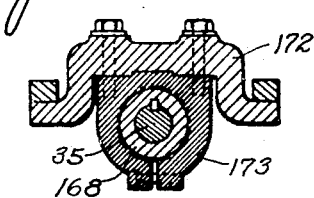

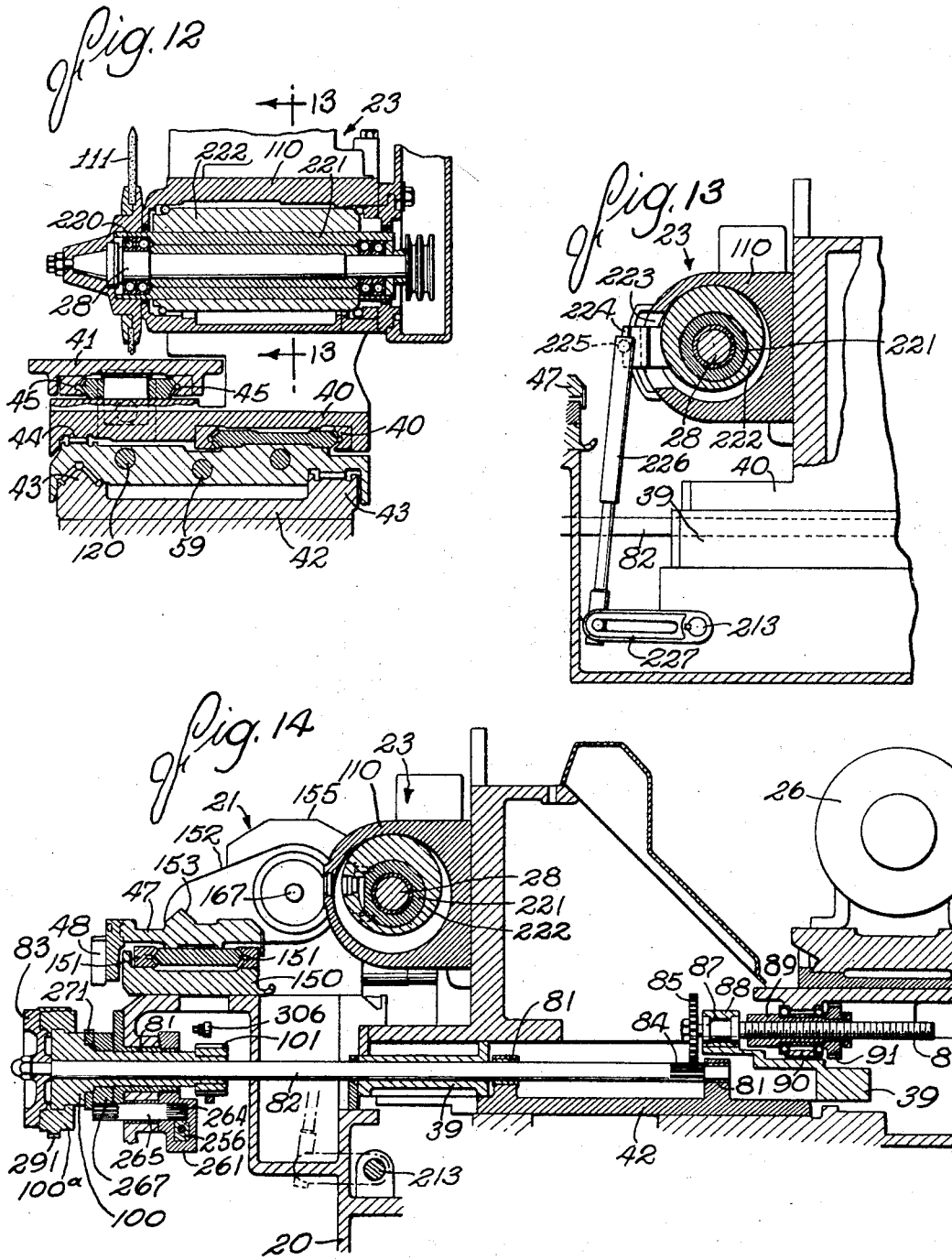

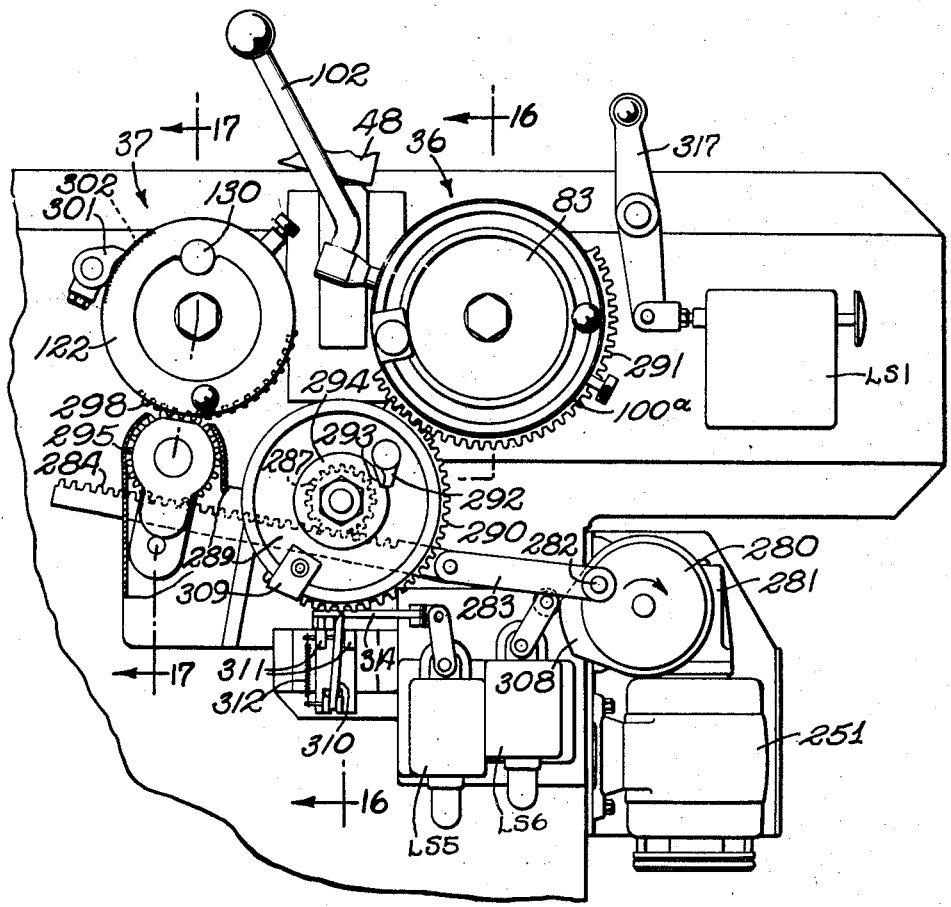

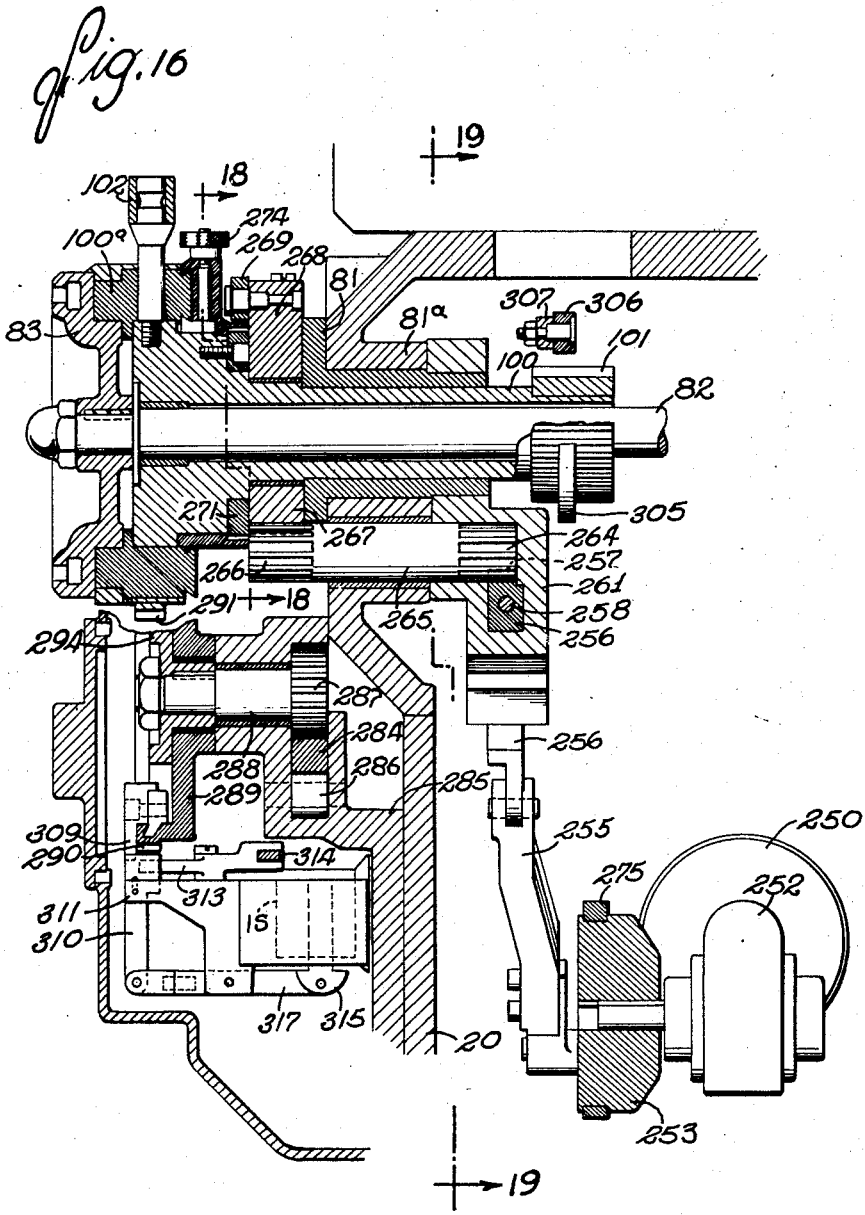

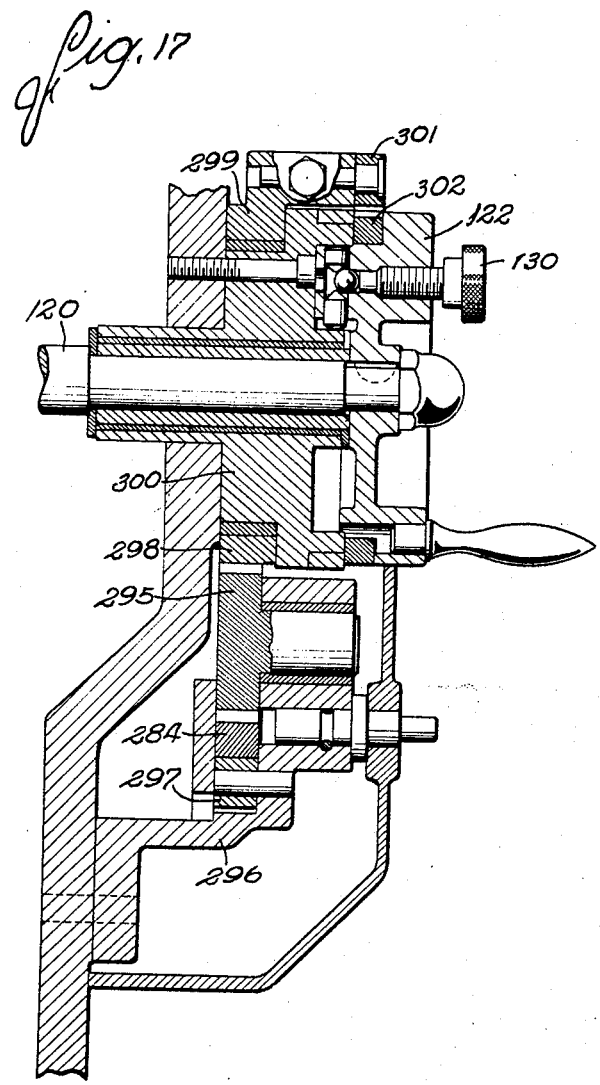

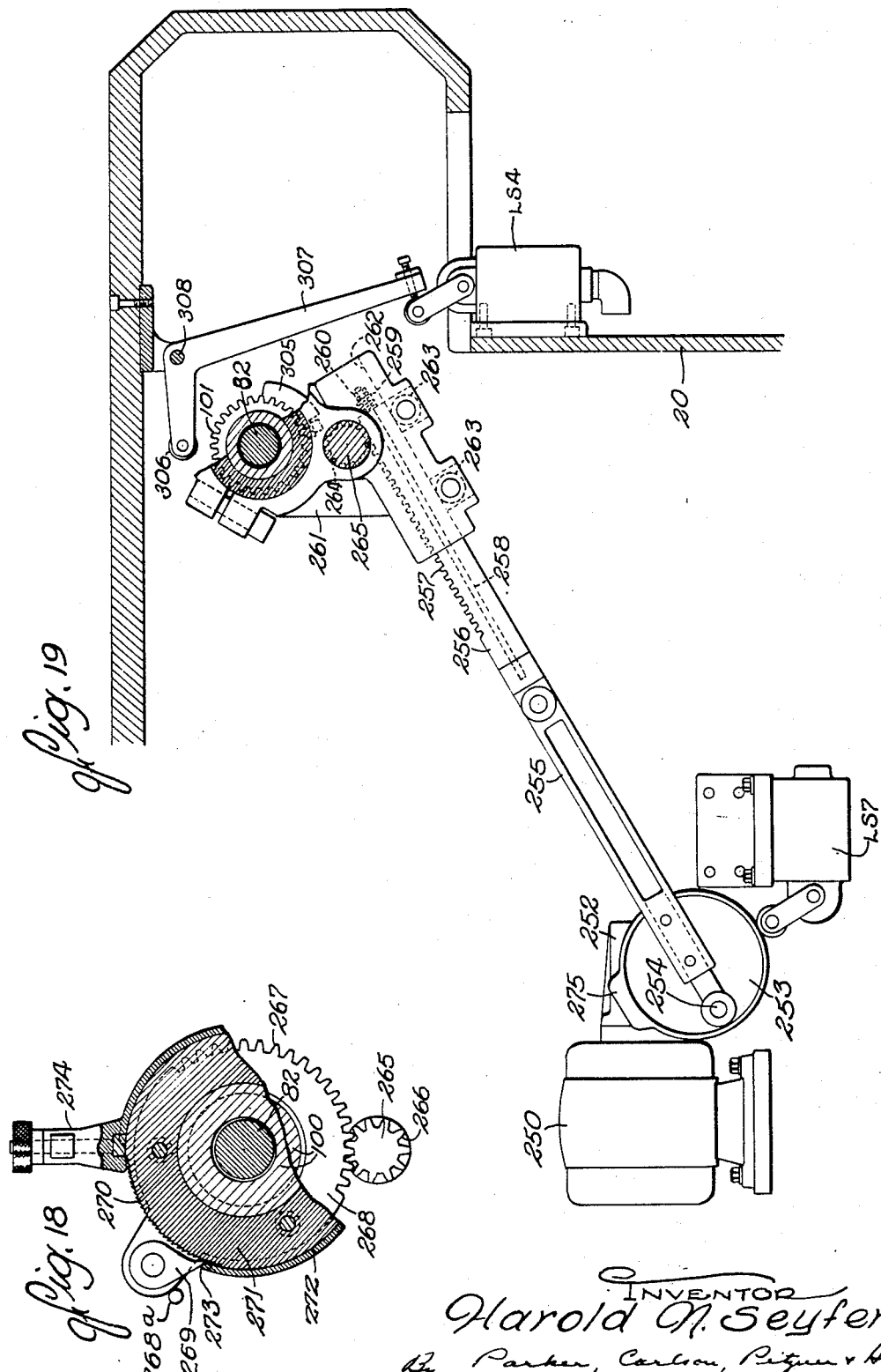

Fig. 21

Patented Apr. 20, 1943

2,317,226

UNITED STATES PATENT OFFICE 2,317,226

MACHINE TOOL

Harold N. Seyferth, East Detroit, Mich., assignor to Ex-Cell-O Corporation, Detroit, Mich., a corporation of Michigan Application August 3, 1940, Serial No. 350,338

34 Claims. (Cl. 51—95)

The invention relates to machine tools and has particularly to do with thread grinding machines.

One object of the invention is to provide a thread grinding machine which is fully automatic in operation so that a workpiece can be set up in it and the machine started, whereupon it executes automatically a complete cycle for precision grinding a thread of selected form on the workpiece. By virtue of its automatic cycle, such a machine obviates the spoilage of work and machine damage incident to operator inattention, mistakes or errors in judgment which almost inevitably occur in connection with a purely manually controlled machine. Moreover, a single operator is able to attend to a multiplicity of such cyclic or automatic machines as are herein contemplated.

More specifically, it is an object of the invention to provide a grinding machine capable of executing, without supervision, a complete automatic cycle in which the grinding tool makes several passes over the work in completing the grinding, the necessary relative shifting of the work and tool for the passes, and repositioning of the tool for each new pass, all being taken care of, as well as dressing of the tool and automatic repositioning of it to compensate for changes in tool size incident to the dressing.

Another object is to provide a grinding machine embodying a novel and easily manipulated arrangement for instituting an automatic cycle of operation thereof by simply moving the quick-advance lever for the wheel carriage in the manner normally employed to advance the wheel carriage during manually controlled operation of the machine.

The invention also resides in the provision, in an automatic machine of the character indicated, a novel electrical control system embodying one or more of the following features:
(a) simplicity of controls manipulated by the operator; (b) great flexibility of adaptation to the requirements of particular kinds of work; (c) simplicity and low cost for the control layout and apparatus; (d) complete safety of operation both under normal conditions and to meet sudden emergencies arising while the work is in progress.

Other objects and advantages will become apparent in the following description and from the accompanying drawings, in which:

Fig. 4 is a horizontal sectional view of a part of the machine taken along the line 4—4 of Fig. 1.

Fig. 5 is a vertical sectional view taken substantially along the line 5—5 of Fig. 1.

Fig. 6 is a sectional view illustrating a detail of the mechanism which controls the movement of the grinding wheel in cutting a taper thread and is taken along the line 6—6 of Fig. 3.

Fig. 7 is a fragmentary rear view illustrating the supporting means for the grinding wheel assembly and dressing device.

Fig. 8 shows in perspective and somewhat diagrammatically means for controlling the relationship of the grinding wheel and the dressing device.

Fig. 9 is a view in vertical axial section through the work head or headstock and is taken along the line 9—9 of Fig. 2.

Figs. 10 and 11 are transverse sectional views through the work head or headstock taken along the lines indicated by the numerals 10—10 and 11—11 in Fig. 9.

Figure 3:
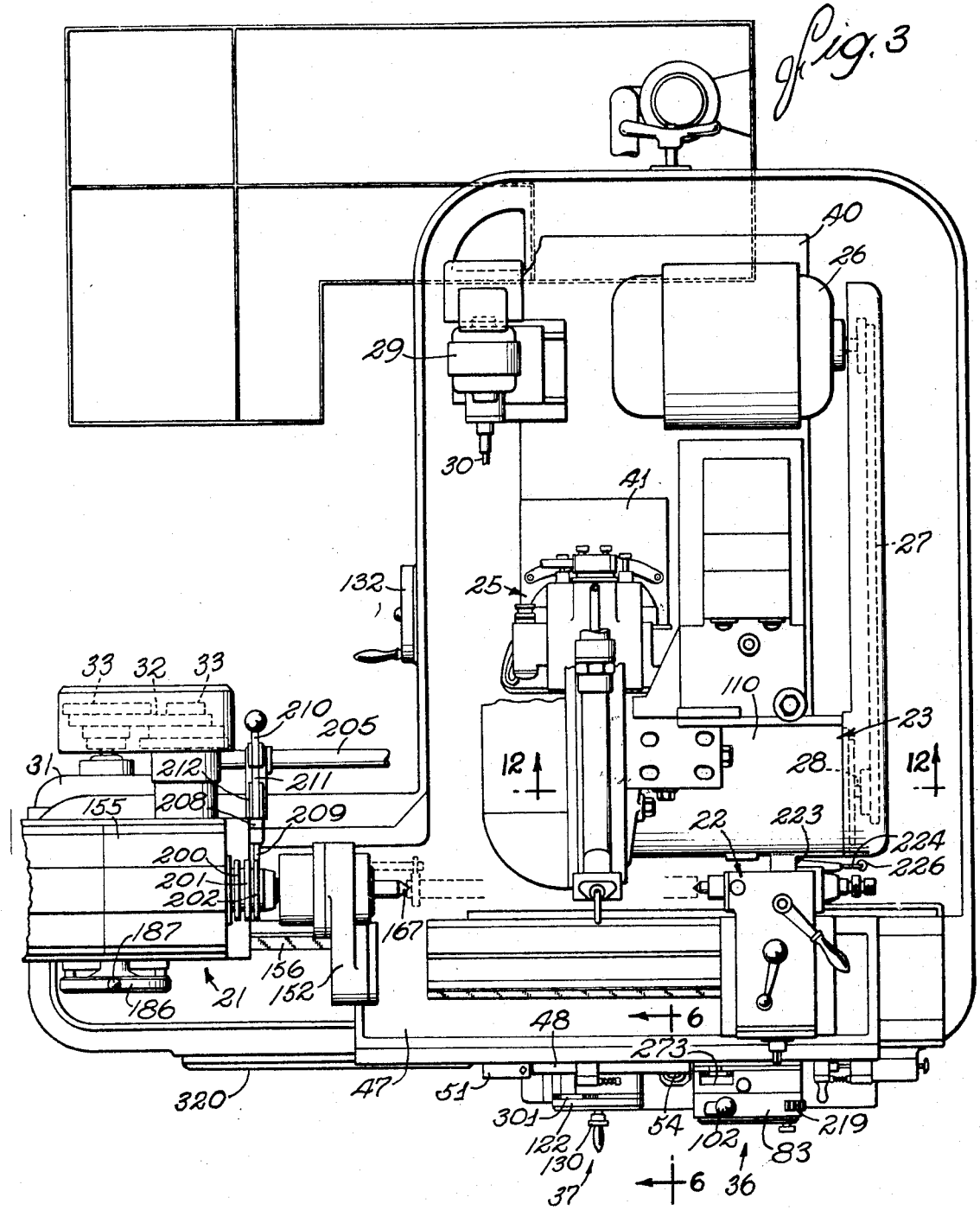
Fig. 3 is a plan view of the machine.

Fig. 12 is a partial sectional view taken on a vertical plane through the axis of the grinding wheel spindle substantially along the line 12—12 in Fig. 3.

Fig. 13 is a transverse sectional view through the grinding wheel spindle assembly taken along the line 13—13 of Fig. 12.

Figure 1:
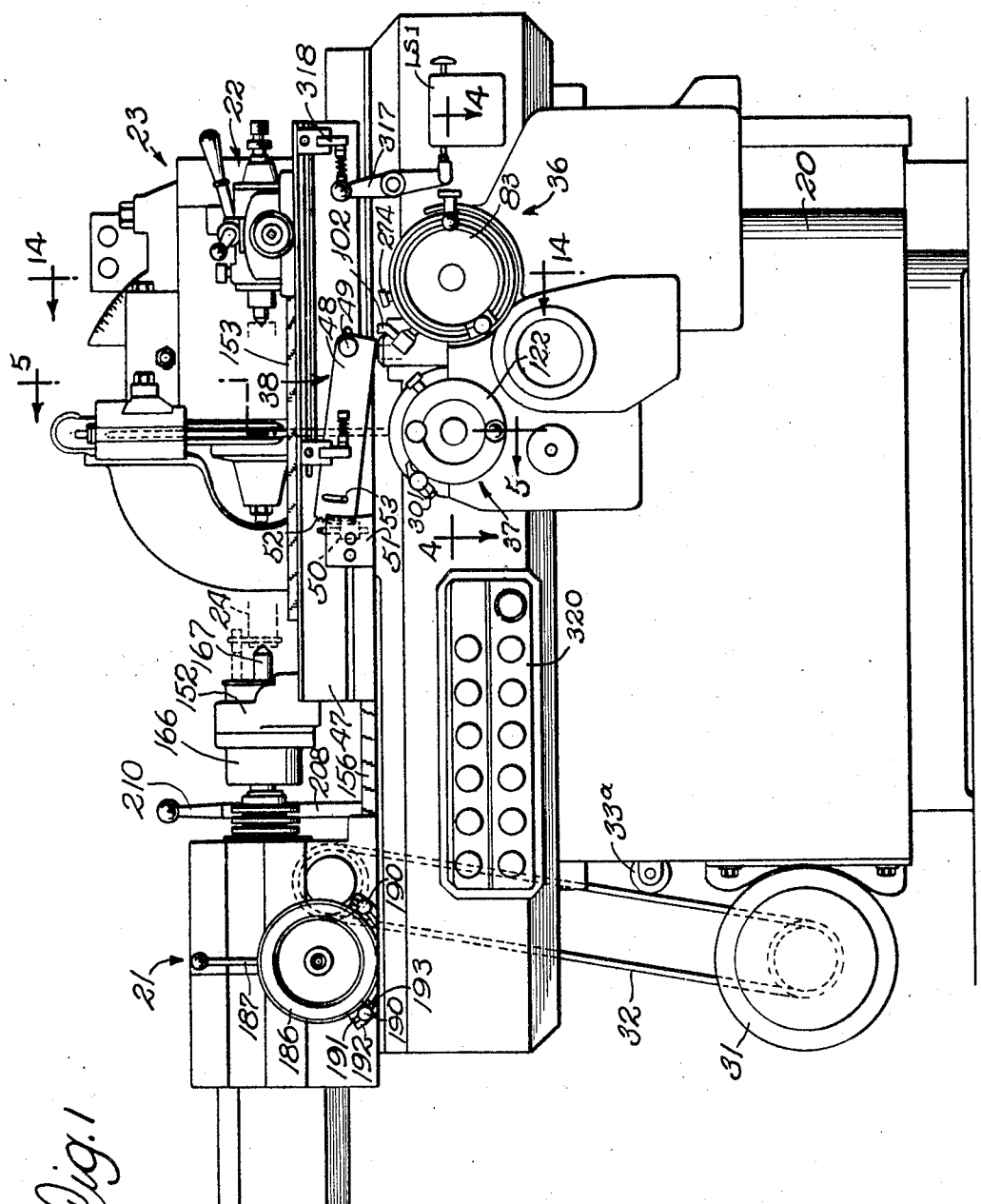
Figure 1 is a front elevation of a machine tool embodying the features of the invention.

Fig. 14 is a transverse sectional view of the machine taken along the line 14—14 of Fig. 1.

Fig. 15 is an enlarged fragmentary front elevation of the control mechanisms located on the right end portion of the machine as viewed in Fig. 1.

Figs. 16 and 17 are vertical sectional views taken respectively along the lines 16—16 and 17—17 in Fig. 15.

Figs. 18 and 19 are detail sectional views taken respectively along the lines 18—18 and 19—19 in Fig. 16.

Figure 20:
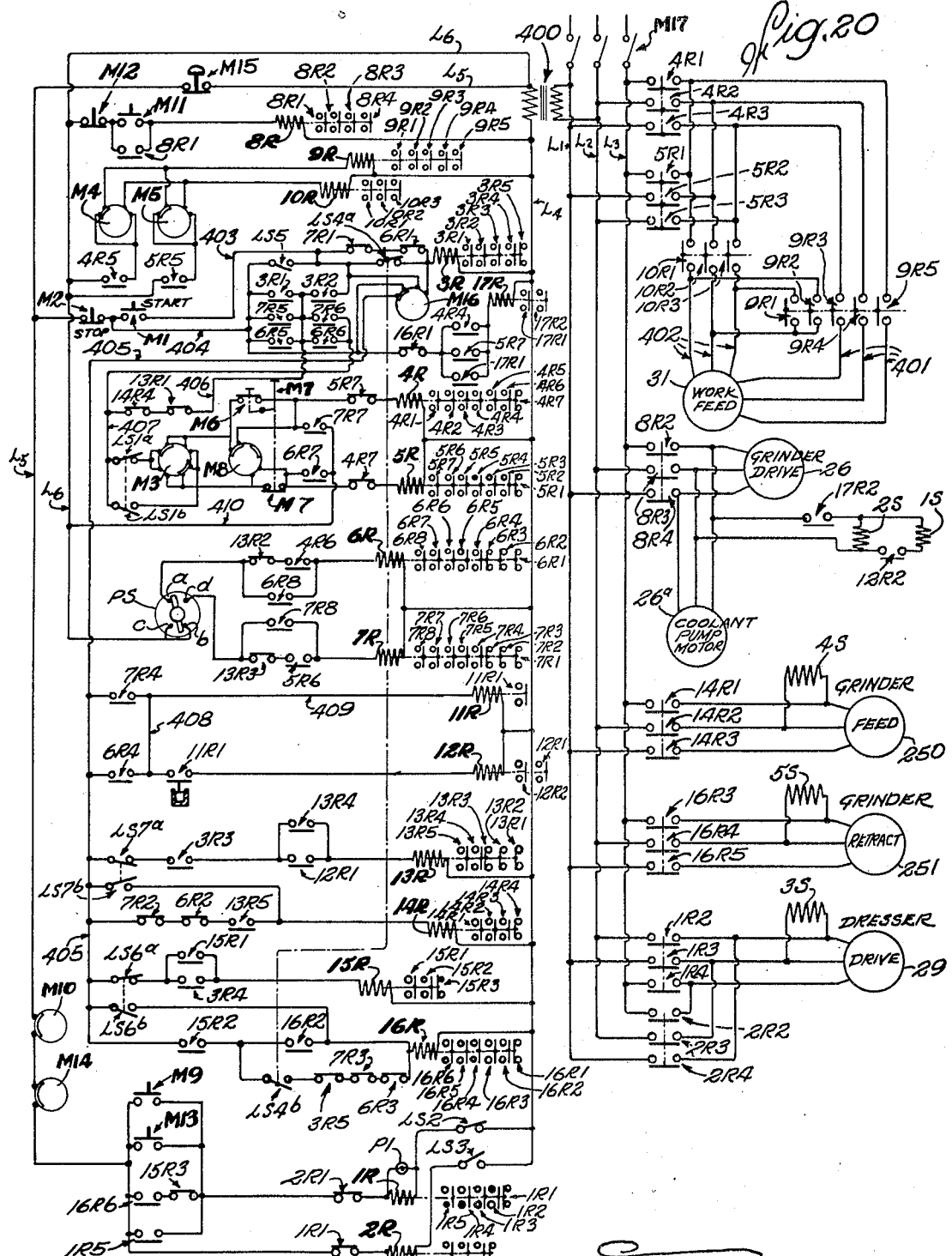

Fig. 20 is a wiring diagram of the control and motor supply system for the machine.

Figure 21:
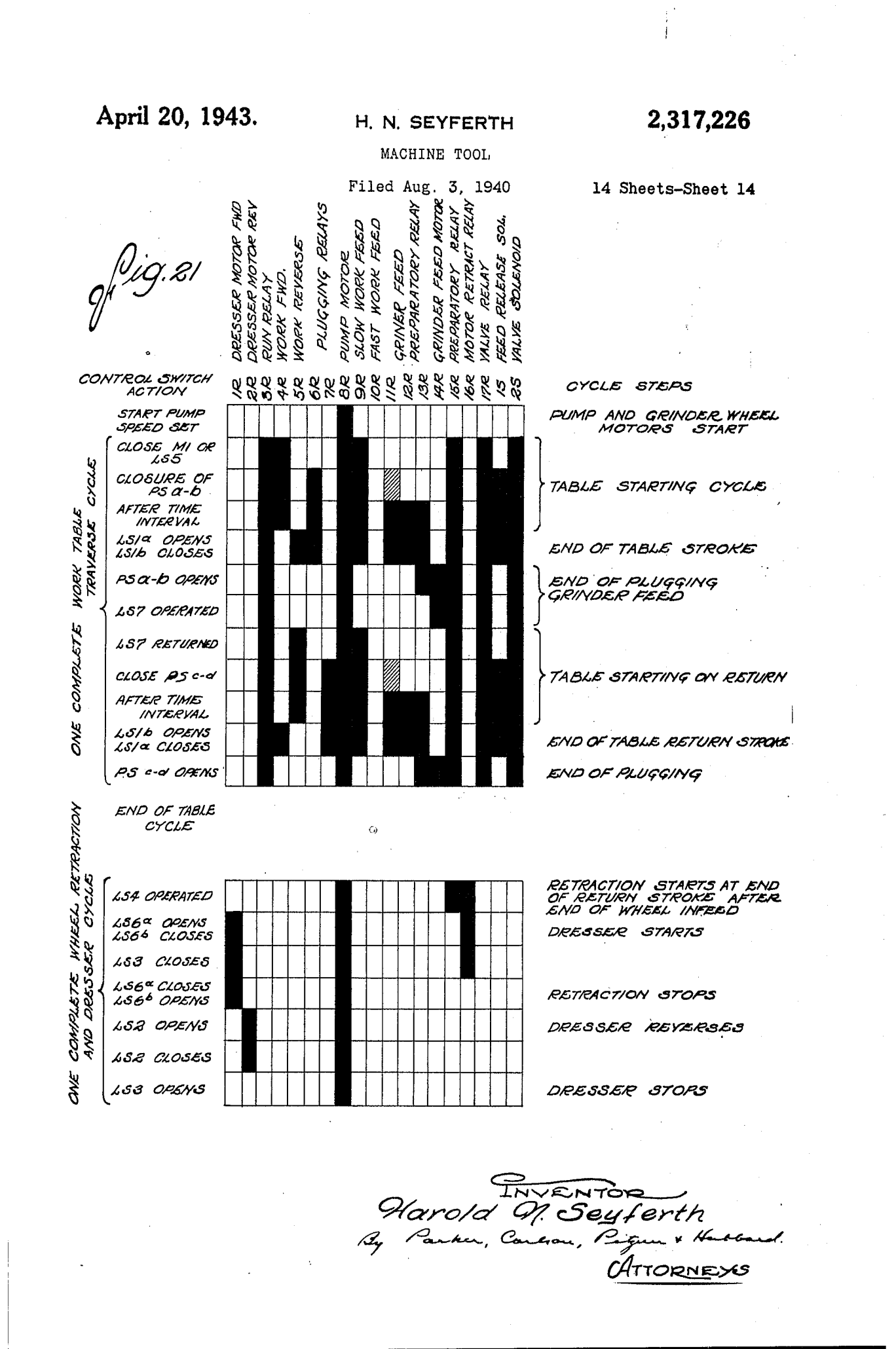

Fig. 21 is a diagrammatic time chart for the operation of the control devices of the machine.

For purposes of exemplification, I have shown the invention herein as embodied in a thread grinding machine that can, by the manipulation of a simple change-over control hereinafter described, be used either as a fully automatic machine, or as a manually controlled or operatorsupervised machine. For purposes of simplification, I have first of all described the machine structure and the manual control devices for it which are used when it is operating non-automatically. Following that I have described the switches, etc., their association with the various machine elements and their interrelation in a unified control system to effect completely automatic operation.

*Machine structure and manual adjustments for non-automatic operation*

The present machine, in its illustrated embodiment, has a machine base 20 supporting a horizontally traversable work slide or table 47 with a headstock 21 on its left-hand portion (Figs. 1, 2 and 3) and a tailstock 22 on its right-end portion. A grinding wheel assembly generally designated as 23, is located rearwardly of a piece of work 24 supported by the head and tailstocks, and a dressing device 25 is located rearwardly of the grinding wheel assembly. Four main operating motors are provided in the machine, including a grinding wheel drive motor 26 on the rear side of the base connected by a belt 27 with a drive shaft 28 for the grinding wheel, and a reversible dresser motor 29 also located at the rear of the base and connected by a flexible shaft 30 with the driven elements of the dressing device. The third motor 31 (Fig. 2) is a reversible feed motor for revolving the work being threaded and traversing it past the grinding wheel, and is connected by a belt drive 32 and stepped cone pulleys 33 with a drive shaft 34 (Figs. 9 and 10) for the work shaft 35. A fourth motor 26ª drives a coolant pump (not shown) to supply coolant to the wheel during grinding. Certain additional motors are included in the machine for use in the automatic cyclic operation, but they will be described later.

In the operation of the machine, the work 24 (Fig. 1) is traversed endwise and revolved in timed relation so that the grinding wheel engaging its periphery forms in the work a thread of correspondingly controlled pitch. The wheel is fed toward the work to determine the depth of cut and withdrawn intermittently to be dressed by the dresser mechanism 25.

The relationship of the grinding wheel and the dressing device, and of the grinding wheel and the work, are controlled simply and conveniently from the operator's station at the front of the machine. The adjustment devices used during manual or non-automatic operation of the machine include a feed control means 36 by which the operator may set the machine to produce a predetermined depth of cut in the workpiece, control the feed of the grinding wheel into the workpiece, or quickly retract the grinding wheel out of engagement therewith. The adjustment mechanisms also include a dressing device control means, generally designated as 37, by which a dressing relationship of the dressing device to the grinding wheel is obtained, and this means also includes means for effecting a compensating adjustment of the grinding wheel to the workpiece, whereby in initial relation of the grinding wheel and workpiece remains fixed regardless of the number of dressing operations or the variation in the diameter of the grinding wheel resulting from the removal of abrasive in the dressing operation. The adjustment means further include means, designated generally as 38, for adjusting the machine to grind straight or tapered screw threads.

The three main adjustment means outlined above are, as will hereinafter be more particularly described, interrelated by a novel arrangement of three superimposed slides arranged for conjoint as well as relative movement and comprising (as shown in Fig. 5) a lower slide 39, an intermediate slide 40 and an upper slide 41. The slides for convenience will hereinafter be termed the taper slide 39, the wheel slide 40 and the dresser slide 41. The three slides have parallel movement in a front to rear direction of the machine base, i. e. transverse to the axis of the work 24. Thus, as shown in Fig. 12, the base has a plate 42 (see also Fig. 5) rigidly secured thereto beneath the taper slide 39 and ways 43 on the plate support the taper slide. On the upper surface of the taper slide 39 are ways 44 supporting the wheel slide 40 and on the upper surface of the wheel slide are ways 45 supporting the dresser slide 41. This superimposed relation of the slides results in conjoint movement of them. Thus when the lowermost or taper slide 39 is advanced or withdrawn the wheel and dresser slides 40, 41 move with it. Similarly, when the wheel slide 40 is advanced or withdrawn (over the taper slide) the dresser slide moves with it in addition to the wheel assembly on it. Finally, the dresser slide 41 can be advanced or withdrawn independently of the other two slides.

The actuating means for moving the taper slide will be described first, particular reference being made to Figs. 1, 4 and 6. This taper slide is, in brief, arranged to be moved in timed relation to the work slide 47 carrying the head and tailstocks between which the work 24 is received. It may be noted here that this work slide is mounted on longitudinal ways 151 on the upper surface of the base so that the work slide has a reciprocatory movement as will hereinafter be explained to feed the workpiece 24 in a path generally paralleling the axis of the grinding wheel. To actuate the taper slide for ordinary taper thread cutting, a sine bar 48 is positioned on the front face of the work slide 47, pivoted thereto on a horizontal axis as at 49 through one end of the sine bar. The sine bar is adjustable to vary its angle of inclination relative to the reciprocatory movement of the work slide 47 by such means as a worm 50 supported in a housing 51 on the work slide for engagement with a rack segment 52 on the free end of the sine bar. A shouldered screw 53 engaging the work slide 47 and extending through a coacting arcuate slot in the end of the sine bar, holds the latter in any position of adjustment. The lower side of the sine bar 48, in its movement with the work slide 47, rides over the upper end of a vertically slidable plunger 54 (Fig. 6) supported by a bearing 55. The lower end of the plunger engages one arm of a bell crank lever 56 which is pivoted as at 57 to a support 58, the other end of the bell crank lever being in engagement with the front end of a rod 59, and as shown in Fig. 4, it extends rearwardly through the taper slide 39 and through the rear side of the base. Through the medium of the mechanism next described below, oscillation of this bell crank 56 is used to shift the taper slide.

A wing nut 60 engages the rearwardly projecting end of the shaft 59 and a spring 61 encircles the rear portion of the shaft and bears between the rear wall of the base and the adjacent side face of the taper slide 39. This spring is tensioned to urge the taper slide forwardly. Extending across the front of the taper slide is a wiper plate 62 having an elongated sleeve 63 secured thereto and encircling the rod 59. The forward end of the sleeve 63 has external screw threads thereon for engagement by a nut 64 which is rigid with a gear 65. An elongated collar 66 secured to the sleeve 63 encloses the end of the nut 64 as well as a spring 67 which is seated against a shoulder on the sleeve 63 and exerts its force against the end of the nut 64 through a thrust washer 68. Movement of the nut 64 and gear 65 axially of the rod 59 is prevented by thrust bearings 69 fixed on the rod 59 on opposite sides of the gear 65. Thus, when the bell crank 56 is oscillated counterclockwise (as viewed in Fig. 8) it thrusts the rod 59 inward and thereby moves the taper slide inward, force being transmitted to the latter through the rod 59, thrust washer 69 and the gear and nut and collar assembly at the front of the slide (Fig. 4). Similarly, oscillation of the bell crank 56 in the opposite direction permits the taper slide 39 to move forward under the urging of the spring 61 on the rod 59.

In some instances the taper slide may be used to move the slides 40, 41 superimposed on it for some other purpose than in grinding a taper thread, as, for example, quick retracting the grinding wheel from the work or feeding the wheel toward the work. For such cases rotation of the gear 65 is used to effect movement of the taper slide, as next described.

Rotation of the gear 65, by means to be described, will move the taper slide 39 rearwardly or return it to a predetermined position relative to the rod 59. The screw threads on the nut 64 and sleeve 63 preferably have a coarse pitch to produce movement through a fairly wide range by limited rotation of the gear 65. This movement by the gear 65 is incidental to and independent of movement transmitted to the taper slide by the sine bar through the plunger 54, bell crank 56, rod 59, thrust washer 69 and the gear, nut and collar assembly at the front of the taper slide. The wing unit 60 limits the forward movement of the taper slide and when it is desired to render the sine bar ineffective as in grinding straight threads the wing nut may be turned to draw the holding rod 59 rearwardly against the tension of the spring 61 to a position in which the front end thereof cannot be engaged by the bell crank.

Movement of the taper slide 39 by rotation of the gear 65 and nut 64 is possible even when the rod 59 is retracted by the wing nut 60 to disable the true taper controlling action of the slide, and consequently movement of the taper slide may be and is employed to shift the grinding wheel toward and away from the position to which the grinding wheel is adjusted for the required size or depth of cut in the workpiece. In other words, the taper slide is used to withdraw the superimposed wheel slide 40 as occasion may require but without disturbing the previous precision determined setting of the wheel slide's own adjusting mechanism. Hence, when the taper slide is later restored to its initial position, the wheel slide will also be brought back without the necessity of regauging the position of the wheel on it relative to the taper slide and, hence relative to the work.

The actuating means 36 for adjusting the grinding wheel to a position relative to the work, either by taper or wheel slide movement, is best seen in Figs. 4, 8 and 14. Rotatably supported by bearings 81 on the plate 42 and a boss 81ª on the front wall of the base is a shaft 82 which extends slidably and rotatably through the front portion of the taper slide 39. Beyond the front wall of the base the shaft has a hand wheel 83 fixed thereto. Near its rear end the shaft has an elongated spur gear 84 thereon for engagement with a spur gear 85 on a lead screw 86 (Fig. 14) which extends rearwardly and is journaled as at 87 for rotation without axial play in a boss 88 extending upwardly from the taper slide 39. The rear end of the lead screw 86 is threaded in a nut 89 which is rotatably supported without axial play by a boss 90 depending from the wheel slide 40.

Rotation of the shaft 82 by rotation of the hand wheel 83 at the operator's station will, through gears 84, 85, rotate the lead screw 86 in the nut 89 to move the wheel slide 40 transversely of the workpiece. This adjustment enables the operator to set the wheel slide 40 at the position which determines the final or finished size of the workpiece. The nut 89 has on its rear end a spur gear 91, the purpose of which will presently be described.

Associated with the size control shaft 82 is manual control means for moving the taper slide 39 by rotation of the gear 65, this movement being utilized to retract the grinding wheel wholly or partially from a workpiece and to advance the grinding wheel to engage the workpiece or to feed the grinding wheel incrementally into the workpiece until the grinding wheel has cut to the finished size determined by the preliminary setting of wheel 83. Thus, referring to Figs. 4 and 14, sleeve 100 encircles the front end of shaft 82 rearwardly of the hand wheel 83 and is elongated to extend through the front bearing 81 in the boss 81ª on the base. At its rear end within the base the sleeve 100 carries an elongated gear 101 in mesh with the gear 65 carried on the taper slide rod 59. Adjoining the hand wheel, an enlarged ring 100ª is secured to the sleeve 100 to support a hand lever 102 (Figs. 1 and 4) by which the sleeve 100, the gears 101, 65 and the nut 64 may be rotated to retract or advance the taper slide 39. Since the grinding wheel assembly 23 is mounted on the taper slide 39 such movement will vary the depth of the cut made by the grinding wheel in the workpiece. Thus the grinding wheel may be quickly withdrawn from the work at the end of or during a cut for replacement of the workpiece or to dress the grinding wheel without altering or disturbing the initial adjustment for size obtained through shaft 82. Preferably suitable stops (not shown) are provided to limit the handle movements 102 to an arc which will produce a travel of the taper slide only slightly greater than that necessary to retract the grinding wheel periphery to clear the greatest depth of thread which will be cut.

The grinding wheel assembly 23 includes a wheel head 110 (Fig. 12) in which the drive shaft 28 for the grinding wheel 111 is journaled. The wheel head is suitably mounted on a side of the wheel slide 40 for angular adjustment of the grinding wheel in conformity with the helix angle of the thread being cut on the workpiece. The driving motors 26, 29 for the grinding wheel shaft and the dressing device respectively are mounted on the wheel slide 40 near the rear end thereof. The dressing device is mounted on the dresser slide 41 behind the grinding wheel 111 and the mounting includes a transverse slide 112 (Fig. 5)

for properly alining the dressing devices with the edge of the grinding wheel.

Referring to Figs. 4 and 5 the manual adjusting means 37 for the dressing device includes a shaft 120 extending rearwardly from the operator's station in front of the machine into the taper slide 39 where its rear portion is supported by spaced bearings 121 on the plate 42. The shaft is rotatably and slidably supported by the taper slide 39 and an operator's hand wheel 122 is secured to its front end. Along its rear portion the shaft has an elongated spur gear 123 engaged by a spur gear 124 secured to the front end of a shaft 125 having a feed screw thread 126 formed thereon. The shaft 125 is rotatably supported without axial play by bearings 127 on the wheel slide 40. The feed screw 126 is engaged by a nut 128 carried by an arm 129 depending from the dresser slide 41. Thus movement of the dresser slide to effect a dressing engagement of the dressing diamonds or the like (one of which is indicated at 25a in Fig. 5) with the rear side of the grinding wheel 111 may be obtained by rotation of the hand wheel 122 and any desired relationship may be maintained by suitable locking means 130.

For the convenience of the operator in setting up the machine from the left-hand end thereof, supplemental means for rotating the shaft 120 may be provided. This means, as shown, comprises a cross shaft 131 rotatably mounted on the base to extend from beneath the shaft 120 through the left end of the base. The outer end of the cross shaft has a hand wheel 132 thereon and the inner end carries a spiral gear 133 meshing with a similar gear 134 on the shaft 120.

The manual adjusting means which have been described enable the operator to set the machine to cut to size or depth, to move the dressing device into dressing engagement with the grinding wheel and to shift the grinding wheel and dressing device as a unit toward and away from the workpiece. Additionally, means is provided for automatically compensating for the variation in the grinding wheel diameter resulting from the dressing operations, whereby to maintain constant the original setting determining the finish size or depth of cut. Referring to Figs. 5, 7 and 8, the compensating means, according to the present embodiment, includes the following arrangement: The rear end of the dresser slide control shaft 125 has a spur gear 140 secured thereon which through a pair of intermediate pick-off idler gears 141, 142 (Fig. 7) drives the gear 91 on the rotatable nut 89. This nut (as previously described) is rotatably mounted without end play on the wheel slide 40 and engages the feed screw threads on the shaft 86 carried by the taper slide. Thus, when the dresser slide 41 is moved toward or away from the grinding wheel 111 the rotary movement of the shaft 125 also drives the nut 89 through gears 140, 141 and 142 to move the nut along the stationary shaft 86, thereby shifting the wheel slide 40 in the direction of the dresser slide movement. The arrangement is such that the wheel slide 40 is moved through the distance required to maintain the initial size or depth of cut relation between the grinding wheel and the work. In other words, when the dresser slide 41 moves relative to the wheel slide 40, the wheel slide also moves an equal distance (carrying with it the dresser slide) to compensate for the reduction in wheel radius by the removal of material from the grinding wheel in dressing it. One of the idler gears 141 or 142 may be disengaged to enable the operator to adjust initially the dressing device along the wheel slide without movement of the latter.

The supporting and driving means for the workpiece includes means for rotating the workpiece and for translating it with a feed movement past the grinding wheel 111. Also included is means actuated in timed relation to workpiece rotation for advancing and retracting the grinding wheel relative to the workpiece for relief cutting as, for example, in grinding taps or hobs.

Referring to the machine structure which supports and drives the workpiece, a plate 150 (Figs. 5 and 14) along the front side of the base has adjustable opposed V-shaped ways 151 which, through interposed roller elements, support the work slide 47 for reciprocatory movement.

Extending upwardly and rearwardly from the left-hand end of the work slide 47 is a pedestal 152, the purpose of which will be presently described. The upper surface of the work slide is provided with ways 153 for adjustably supporting the tailstock 22. The headstock or work head structure 21 includes, as may be seen in Figs. 1, 2, 3, 9 and 10, a housing 155 which is supported by side and bottom guideways 156 on the base for adjustment along the line of movement of the work slide. Suitable lock means 157 (Fig. 9) secure the work head in an adjusted position. To maintain the driving belt 32 taut in the various positions of adjustment of the work head, such means as an adjustable idler pulley 33a (Fig. 2) may be employed.

The shaft 34, as shown in Fig. 10, extends into the lower portion of the housing 155 and is rotatably supported therein by spaced bearings 158. Centrally of the housing the shaft 34 has a worm 159 keyed thereto for engagement with the worm wheel 160 secured to a flange 161 on an elongated sleeve 162, which slidably encircles the work shaft 35. Such means as a sliding feather key 163 drivingly connects the sleeve and shaft. One end of the shaft 35 (the right-hand end as shown in Fig. 9) extends through a dust seal 164 at the end of the sleeve and is supported by combined radial and thrust bearings 165 in a housing 166 which is secured to the end of the pedestal 152. A live center 167 on the shaft 35 extends beyond the housing 166 for engagement with the workpiece.

At its opposite end the shaft 35 (Fig. 9) is of reduced diameter to receive an elongated sleeve or shell 168 which is keyed to the shaft as at 169 and is detachably secured thereon by cap screw and washer means 170. The external surface of the collar 168 has precise lead screw threads 171 therein and the sleeve illustrated is one of a series of interchangeable sleeves which differ from each other in the pitch of the thread either in a right-hand or left-hand direction. A slidable nonrotatable frame 172 has secured thereto, as shown in Fig. 11, a split nut 173 constituting a master lead nut engageable with the lead screw on the sleeve 168. The nut is also interchangeable. Fixed on the inner end of the frame is a centrally apertured disk 174 through which the shaft 35 extends. A flanged collar 175 encircles the shaft 35 and extends through the aperture in the disk 174 to dispose the collar flange 176 behind the disk. Between the disk 174 and the flange is a thrust washer 177 and on the other side of the disk is another thrust washer 178 abutted by a spacing ring 179 in turn engaged by a ring 180 carrying a worm gear 171. A nut 182, engaging external screw threads on the collar 175, frictionally engages the ring 180 to establish a driving relation between the worm wheel 181 and the collar 175, as well as to bind the disk 174 between the thrust washers 177, 178 and against the flange 176. External screw threads on the collar 175 engage an internally screw threaded member 183 which is fixed to the housing 155. The worm wheel 181 is engaged by a worm 184 on a shaft 185 which is journaled on the housing and extends through the front side thereof, and a wheel 186 having an operating handle 187 is secured to the front end of the shaft. The numeral 189 (Fig. 9) designates bearings in the housing 155 for supporting the shaft 35 and its associated mechanism.

In operation, the housing 155 is adjusted longitudinally of the base to dispose the workpiece between the head and tailstock centers substantially in proper relation to the grinding wheel. A more accurate relation is obtained by rotation of the wheel 186 which, through shaft 185, worm 184, worm wheel 181, rotates collar 175 to shift it longitudinally of the work head casing 155. Since the sliding frame 172 is connected through disk 174 with the collar 175, axial movement of the latter will shift the frame 172, thereby moving the master lead screw and nut and the shaft 35 axially. Such axial movement of the shaft 35 is transmitted to the worktable and tailstock thereon through the pedestal 152 to adjust the position of a workpiece mounted between the head and tailstock centers with respect to the grinding wheel. The means just described, after the initial adjustments have been made, is used to "pick up" the lead on successive workpieces at the beginning of a cutting operation.

The same mechanism has a further purpose. Machines of the type here under consideration may be arranged to perform a cutting operation during movement of the workpiece past the grinding wheel in either direction. It is impossible to eliminate entirely backlash or play in the mechanism which feeds the workpiece and compensation must be made for such backlash at the beginning of each reversal of movement. The means for shifting the shaft 35 axially is used to compensate for backlash. Thus, a pair of stops 190 (Fig. 1) mounted for adjustment along an arcuate slot 191 on a bracket 192 adjacent to the periphery of the wheel 186 limit the movement of a pin 193 projecting radially outwardly from the wheel. By properly determining the amount of backlash in any given assembly and by adjusting the stops 190 to limit movement of the wheel 186 through an arc which will produce a commensurate backlash compensating movement of the shaft 35, the operator need only rotate the wheel 186 from one stop to the other at each reversal.

The means in the present machine for moving the grinding wheel for relief or backoff grinding of such cutting tools as taps, hobs, and the like, will be described with reference to Figs. 2, 3, 9, 12, 13 and 14. As shown in Fig. 9, the collar 162, through which the shaft 35 is driven, has a series of cams 200, 201, 202 keyed thereto externally of the housing 155 and held in place by a nut 203. These cams may be termed relieving cams and are formed with various numbers of lobes equal to the number of flutes which are to be relief ground. The cams moreover are shaped to produce the required movement of the grinding wheel.

Figure 2:
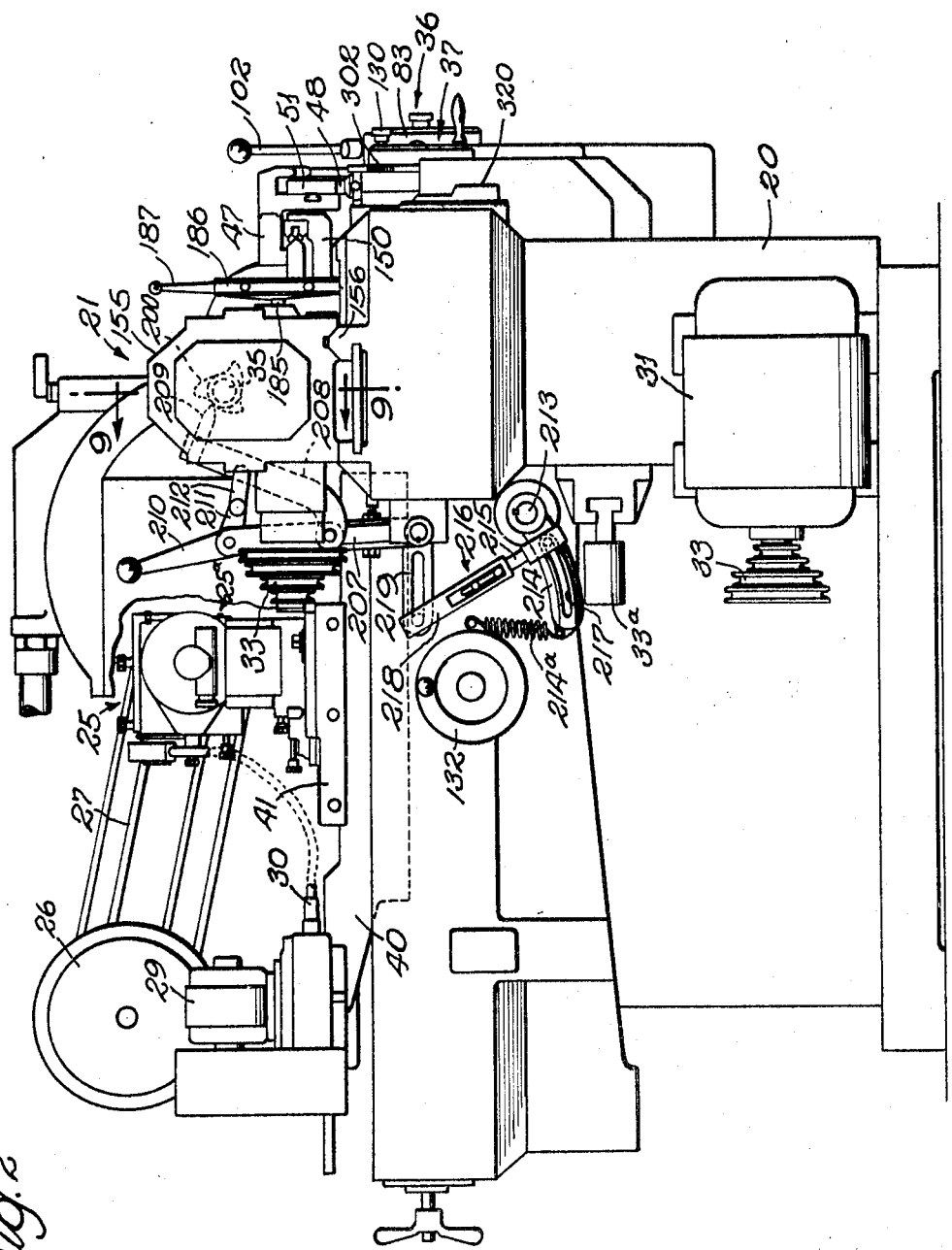
Fig. 2 is a side elevation of the machine as seen from the left-hand end of Fig. 1.

Referring to Fig. 2, a rock shaft 205 is mounted in bearings 206 to extend along and below the work head 155 in a direction parallel to the line of adjustment of said head. Slidably mounted on the rock shaft 205, as by a feather key, is an upstanding lever 207. Suitable means, not shown, is provided for securing the lever to the rock shaft at various positions along the length thereof. Pivoted intermediate the ends of the lever 207 is an arm 208 which extends upwardly at an acute angle to the lever. A cam follower 209 is mounted on the upper end of the arm 208 for engagement with one or another of the relieving cams 200, 201 and 202, as determined by the position of the lever 207, on the rock shaft 205. Pivoted on the upper end of the lever 207 is a bell crank lever having a long arm 210 upstanding to provide a handle and a short arm 211 extending toward the cam follower arm 208.

The end of the arm 211 is connected by a link 212 with the arm 208 to provide a toggle. The arrangement is such that when the handle arm 210 of the bell crank lever is in its forward position (toward the right in Fig. 2), the toggle is extended with the center pivot of the toggle slightly past dead center. In this relationship, movement of the cam follower arm 208, produced by the cam with which the follower 209 is associated, will be transmitted to the lever 207. Rearward movement of the handle 210 will break the toggle alinement and withdraw the cam follower 209 to an inoperative position.

The cam induced movements of the work shaft 205 are transmitted to a second shaft 213 by means which is adjustable through a wide range to determine the ratio of movement between the rock shafts 205 and 213, as well as the rotative position of the rock shaft 213. The rock shaft 213 is journaled on the machine base to extend longitudinally thereof to a position beneath the grinding wheel spindle assembly. On its outer or left-hand end the shaft has an arm 214 secured thereto. A section 215 of an extensible link 216 is arranged to be adjustably secured to the arm along the length of an arcuate slot 217 therein. The other section 218 of the link 216 has an adjustable connection with a slotted arm 219 secured to the rock shaft 205. By adjustment of the length of the link 216 and the relationship of the ends of the link to the arms 214 and 219 substantially any required movement of the rock shaft 213 may be obtained. Spring means 214ᵃ connected to the end of the lever 214 and to the base exerts a force in a direction tending to hold the cam follower 209 in cam engagement.

This movement of the rock shaft 213 advances or retracts the grinding wheel relative to the workpiece and in timed relation to the rotational movement of the workpiece. Referring to Figs. 12, 13 and 14, the grinding wheel spindle or drive shaft 28 is supported by bearings 220 in a spindle casing 221 which extends through an eccentric bore in a carrier 222. The carrier is supported for oscillatory movement by the wheel head 110. The wheel head has a circumferentially extending slot 223 (Fig. 13), and the short end of an angular arm 224 rigid with the carrier 222 extends through the slot. The outer longer end of the arm extends along the wheel housing and at its end has a ball and socket connection indicated at 225 with the upper end of a link 226. The link is adjustably secured at its lower end to an arm 227 fixed on the rock shaft 213. Hence, rocking movement of the shaft 213 will oscillate the carrier 222 which movement, because of the eccentric relation of the shaft 28 to the carrier 222, will produce a desired reciprocatory relieving movement of the grinding wheel with respect to the workpiece.

Résumé of non-automatic operation

In considering the non-automatic operation of the machine, it will be presumed that a cut has been completed and a worn grinding wheel is to be replaced with a new one. The operator, by swinging the retract lever 102, effects withdrawal of the dressing device and of the grinding wheel to clear the workpiece. After a new grinding wheel has been installed, it may be necessary to reposition the dressing device with respect to the grinding wheel periphery. This is done by disengaging the driving connection between the dresser slide's feed screw 126 and the wheel slide 40 through disengagement of one of the pick-off gears 141, 142 to permit the position of the dresser slide to be adjusted with respect to the stationary wheel slide. Once a proper dressing relationship has been established and the drive connection between the dresser slide feed screw and the wheel slide reengaged, further adjustment is unnecessary.

If straight threads are to be ground the wing nut 60 is turned to withdraw the rod 159 to interrupt the connection from the latter to the sine bar 48. If a taper thread is to be ground, the sine bar is moved to an angular relationship with respect to the line of travel of the work table, which will produce a movement of the taper slide 39 commensurate with the angle of the taper to be cut.

By means of the size control wheel 83, the operator moves the wheel slide 40 relative to the work to a forward position at which the grinding wheel will cut the workpiece to a desired size or depth when the taper slide is thereafter brought out to its forward stop position by the handle 102. This is a fixed position of adjustment that is not disturbed during the operation of the machine on a succession of similar workpieces.

After the adjustment for size of the finished cut has been made, the grinding wheel 111 is retracted by throwing the handle 102 to its full retract position. This manipulation of the handle 102 quickly moves the taper slide 39 rearwardly, carrying with it the wheel and dresser slides 40, 41. The operator may then start the grinding operation, during which the inward feeding movement of the grinding wheel is controlled, by movement of the handle 102 in a reverse direction during successive passes of the work relative to the grinding wheel. If only a single pass is to be made, the grinding wheel will be moved to its final depth of cut position at the beginning of the cutting operation. At any time the cutting operation may be instantly discontinued by manipulation of the handle 102 to retract the wheel. To dress the grinding wheel, it is first retracted in the manner described and the dressing device is advanced toward the grinding wheel by rotation of the dresser feed wheel 122. Because of the driving connections which advance the grinding wheel relative to the work a distance equal to the advance of the dressing device toward the grinding wheel, the initial adjustment for size or depth of cut is maintained regardless of the decreasing diameter of the grinding wheel resulting from repeated dressing operations.

It will be noted that the oscillating movement of the grinding wheel spindle in relief grinding is independent of the various movements of the grinding wheel accomplished by shifting the taper or wheel slides. Prior to a dressing operation, the handle 210 of the bell crank lever which controls the engagement between a relieving cam and the cam follower is moved to retract the cam follower. The limit of the retractive movement is fixed so that before the wheel is dressed the means controlling the position of the grinding wheel during relief cutting will be returned to a fixed position before the dressing operation takes place. It will be seen that the present machine is very versatile as to manual adjustment to accommodate different grinding problems, but despite that it may be operated with fully automatic control as described below.

Automatic cycling apparatus

In accordance with one aspect of the present invention, provision has been made for operating the machine described above entirely automatically. In brief, the controls are such as to execute an automatic cycle in which:

(a) The work slide 47 is transversed back and forth to move a corresponding portion of the workpiece past the engaging grinding wheel with a dwell at the end of each stroke of the work slide.

(b) During the dwell period at the end of each work slide stroke the taper slide 39, and the wheel slide 40 on it, are fed forward a predetermined increment of distance to increase the depth of cut during the succeeding pass of the work.

(c) After the incremental infeeding of the taper slide has reached a predetermined total, further reciprocation of the work slide 47 is halted at the end of the work slide stroke succeeding the last incremental infeed making up the total required.

(d) After halting of the work slide reciprocations, as noted just above, the taper slide 39, carrying with it the wheel and dresser slides 40 and 41, is quick retracted to withdraw the grinding wheel 111 from the work.

(e) In the course of the retraction cycle noted in (d) above the dresser mechanism 25 is fed a predetermined increment of distance, and a cycle of operation for the dresser instituted.

(f) At the conclusion of the dresser operation noted in (e) above the dresser mechanism comes to rest and all of the parts of the machine are automatically left in readiness for the institution of a subsequent cycle of like form, at the will of the operator.

It is to be particularly noted that in the course of the feed for the dresser mechanism, the position of the wheel slide 40 is automatically changed with respect to the taper slide 39 so as to compensate for the change in grinding wheel diameter resulting from the dressing. This compensating adjustment is accomplished through the medium of the same compensating mechanism which is used during the manual control of the machine, described above, the particulars of its operation during the automatic cycle being set out in more detail below.

Reference has heretofore been made to four motors included in the machine, namely, the work feed motor 31, the dresser drive motor 29 and the grinder drive and coolant pump motors 26 and 26a. In addition, two further motors are provided for use during automatic operation, these being a grinder feed motor 250 and a grinder retraction motor 251 (Figs. 15, 19 and 20). In brief, the grinder feed motor 250 is used to turn the sleeve 100, heretofore noted (see Fig.

4) in a direction to feed the grinding wheel 111 toward the work. This feeding is accomplished in successive increments. The grinder retraction motor serves, on the other hand, not only to turn the sleeve 100 in an opposite direction to quick retract the grinder wheel out of engagement with the work at the completion of the grinding, but is also used to turn the shaft 120 to feed the dresser mechanism 25 an amount required to dress down the wheel for the next grinding cycle.

To correlate the operation of all six motors noted above in an integrated system so that the various elements of the machine will be operated in proper timed relation, a series of machine element-operated, or so-called limit switches LS1 to LS7 are utilized. In some instances, as for example, in the case of the switch LS1, the switches have two contacts which are alternatively closed and opened as the switch is thrown from one position to the other. In such instances the individual contacts are designated by the additional letters a and b so that the switch contacts of LS1 are LS1a and LS1b.

Before proceeding to a description of the control circuit through which the various motors and element-operated switches are interrelated, attention will be given to the details of the mechanical connections between the motors 250, 251 and the parts which they operate. First, as to the grinder feed motor 250 (see Fig. 19) it is to be noted that, in general, it operates through a rack and pinion arrangement to drive a ratchet mechanism which in turn steps the sleeve 100 around step by step for successive increments of infeed for the grinder. For this purpose the motor 250 is connected through a speed reduction gearing in a casing 252 to revolve a stroke disk 253 one full revolution for each increment of infeed. The stroke disk has on it an eccentric crank pin 254 by which it is connected to a reciprocable member made up of two sections 255 and 256, the outermost one having rack teeth 257 on it. The two sections 255, 256 are yieldably joined by means including a rod 258 extending through a longitudinal bore in the section 256 and anchored at the outer end to the section 255. At the outer end of the rod 258, a helical compression spring 259 encircles it and is interposed between the outer end of the section 256 and a nut 260 on the end of the rod. A housing 261 having a portion encircling the end of the bearing 81, which receives the sleeve 100 (see also Fig. 16), presents a throat 262 receiving the rack section 256 and has rollers 263 journalled in it and on which the member 256 runs. The rack teeth 257 mesh with pinion teeth 264 on a shaft 265 (Figs. 16 and 19) to revolve the latter as the rack reciprocates.

At its opposite end, the shaft 265 has a second set of pinion teeth 266 (Figs. 16 and 18) meshing with a toothed sector 267 of a spider 268 loosely journalled on the sleeve 100. This spider 268 carries a pawl 269 engageable with a sector of ratchet teeth 270 on the periphery of a collar 271 fixed to the sleeve 100. Each stroke of the pawl 269, effected by a stroke of the feed motor-driven rack 255—256, causes the pawl 269 to engage the teeth 270 and advance the sleeve 100 a predetermined incremental distance. The amount of such advance for the sleeve 100 for each stroke of the pawl 269 is determined by the setting of an adjustable guard sleeve 272 encircling the ratchet-toothed collar 271 and having an opening 273 in it (see Fig. 18) through which the ratchet teeth 270 are exposed. The guard 272 is adjustable about the axis of the sleeve 100 and can be locked in adjusted position on the collar 100a (see Fig. 16) by locking means indicated as 274. By changing the rotational setting of the guard 272, the number of ratchet teeth advanced by the pawl 269 during each stroke of the latter is controlled.

The stroke disk 253 driven by the grinder feed motor (Fig. 19) also has a cam lobe 275 on it for actuation of the limit switch LS7 which operates, in a manner hereinafter described, to stop the motor 250 at the end of each full revolution or feed cycle of the stroke disk 253. In Figs. 18 and 19 the parts are shown in the positions which they occupy after the stroke disk has made one-half of a revolution, being in effect, stop-motion views. The yieldable connection described above between the rack sections 255, 256 makes the same extensible, thereby avoiding destructive stresses in the mechanism in the event that toothed spider 268 should reach ultimate or stopped position before the stroke disk 253 has reached its rest position, and likewise insures that, when spider 268 has reached its full infeed position, it will be pressed against suitable stop means with a pressure produced by spring 259 so that the spider's terminal position is precisely reproduced on each stroke. In the present instance the stop means in question comprises a stationarily mounted pin 268a arranged to abut against the spider 268 as the pawl reaches the end of the opening 273 in the guard sleeve with the position of adjustment of the guard sleeve shown in Fig. 18. In the latter figure of the drawings, the guard sleeve is shown in its position of extreme adjustment in a clockwise direction and which corresponds to maximum advance of the ratchet. Upon adjusting the sleeve 272 in a counterclockwise direction from the position shown in Fig. 18, it will be observed that the number of ratchet teeth exposed to the pawl is decreased and thereby the turning angle imparted to the ratchet by each stroke of the pawl is correspondingly decreased.

Turning now to the grinder retract motor 251, it should be noted, in general, that it operates, at the end of the grinding operation, to revolve the sleeve 100 for a quick retract motion of the grinding wheel and also to feed the dresser mechanism 25 a predetermined increment of distance necessary for dressing the grinding wheel preparatory to the next succeeding grinding operation. Considering first its mechanical connection for effecting a quick retract turn of the sleeve 100, it should be observed that the motor 251 drives a stroke disk 280 (Fig. 15) through a speed reduction gearing in a casing 281, the disk being revolved one full revolution for full retraction of the taper slide 39. This stroke disk is connected by an eccentric crank pin 282 with a link 283, which is in turn pivotally connected at its outer end with a reciprocable rack 284. For each cycle of operation the motor 251 turns the stroke disk 280 one full revolution in a clockwise direction from the position shown, this latter position being that which the parts occupy at the completion of the infeeding movements effected by the feed motor 250 as described above and just prior to institution of retraction. The rack 284 slides in a stationary housing 285 (see Fig. 16) on rollers 286 and meshes with a pinion 287 on a shaft 288 which is revolubly journalled on the housing 285.

Loosely journalled on this shaft is a disk 289 having a sector of teeth 290 thereon (see Fig. 15) meshing with a sector of teeth 291 on the ring 100a fixed to the sleeve 100 as heretofore described. Accordingly, when the rack 284 is drawn to the right (as viewed in Fig. 15) by a clockwise rotation of the stroke disk 280, the disk 289 is oscillated counterclockwise through the engagement of a pawl 292 on it with a notch 293 in a disk 294 fixed to the shaft 288 which carries the pinion 287 (see also Fig. 16). As a result the ring 100a, and attached sleeve 100 are revolved clockwise to fully retract the grinding wheel. This retraction movement is, of course, effected in the same manner as when the hand lever 102 is swung to the right from the position shown in Fig. 15 as described heretofore in connection with the manual operation of the machine.

The rack 284 also serves to revolve a second pinion 295 (Fig. 15) for turning the dresser feed shaft 120. The pinion 295 is journalled in a housing 296 (see also Fig. 17) which receives the rack 284 and has in it a roller 297 on which the rack rides. The pinion 295 in turn meshes with a segment of teeth 298 on a collar 299 encircling the stationary head 300 in which the dresser feed shaft 120 is journalled. On this collar 299 is a pawl 301 (Figs. 15 and 17) engageable with a segment of ratchet teeth 302 on a hand wheel 122. Consequently, each stroke of the motor driven rack 284 causes the pawl 301 to advance the hand wheel 122 a predetermined increment of distance for effecting a corresponding feeding motion of the dresser mechanism 25.

When the shaft 120 is turned, as described above, to feed the dresser mechanism the automatic compensating arrangement previously described in connection with the manual operation of the machine shifts the grinding wheel so as to compensate for the material removed from it in the course of the subsequent dressing. By way of review, note, by reference to Fig. 8, that when the dresser feed shaft 120 is turned it revolves the feed screw 126 for shifting the nut 128 on the dresser slide 41 and at the same time revolves the nut 39 (through gears 140, 141, 142) so that the nut 89 is moved along the stationary screw 86 and in turn moves the wheel slide 40 which is attached to this nut.

In order automatically to energize the retract motor 251 to initiate the operation described above when all of the incremental infeeding movement of the grinding wheel has been completed, a cam 305 (Figs. 16 and 19) is arranged to encircle the gear 101 fast on the sleeve 100. After the sleeve 100 has been revolved a sufficient distance to complete the infeed of the grinder, the lobe of the cam 305 engages and lifts a cam follower roller 306 on the end of a bell crank 307 pivoted at 308 on the frame. The bell crank is thus swung clockwise (as viewed in Fig. 19) so that its lower end actuates the switch LS4. As will hereinafter appear in greater detail in connection with the circuits, this switch LS4 prepares the circuits so that further motion of the work slide 47 will be stopped upon the completion of the next succeeding stroke of the latter and after this stoppage occurs the retract motor 251 is energized to execute its cycle.

Deenergization of the retract motor 251 after completion of one full revolution is accomplished by the switch LS6 (Fig. 15). A cam lobe 308 is provided on the stroke disk 280 and as the latter starts to revolve in a clockwise direction the switch LS6 remains in the position shown until after it has passed over this lobe. Then it drops into a second position and is finally returned to its initial position after the disk 280 has completed one full revolution. It is this return of the switch to its initial position which effects deenergization of the motor 251.

Also associated with the mechanism shown in Fig. 15 is a switch LS5 for starting the complete automatic cycle outlined above when the operator throws the hand lever 102 from its full retract position (to which it has been moved by the action of the motor 251 at the end of the previous cycle) to a position in which the incremental feed is to begin. To throw the switch LS5 for this purpose, a dog 309 is fixed to the disk 289 to project beyond the latter's periphery (see also Fig. 16). The dog 309 is arranged to engage an upstanding pin 310 pivoted at its lower end to swing sidewise for a limited distance between fixed stops 311. A tension spring 312 yieldably urges the pin 310 over against the right hand one of the stops 311, as shown. At its upper end portion the pin 310 is connected through a centrally pivoted link 313 and second link 314 with the switch LS5. Accordingly as the disk 289 is revolved in a clockwise direction by swinging the lever 102 toward a feed position as noted, the dog 309 will strike the pin 310 and swing it over to the left, thereby actuating the starting switch LS5. As the pin 310 strikes the left hand stop 311, however, the dog 309 is positively arrested so that the handle 102 cannot be swung further. After the automatic cycle has been started by this actuation of the switch LS5, the pin 310 is automatically withdrawn from the path of the dog 309. For this purpose a solenoid IS (Fig. 16) is arranged, when energized, to lift its armature 315 and thereby pull up on the inner end of a centrally pivoted lever 316. The pin 310 is pivoted on the outer end of this lever 316 so that the pin is pulled down out of the path of the dog 309. By means which will hereinafter appear, the solenoid IS is energized during the first stroke of the work slide 47 and well before the first feed movement of the disk 289. Once, the pin 310 has been pulled down, after being pushed to the left by the dog, it will, upon later deenergization of the solenoid IS spring up against the face of the dog 309 but will not block it. It should also be noted at this point that the faces of the pin 310 and dog 309 are contoured so that the dog can cam freely over and depress the pin 310 when the disk 289 is turning in the opposite or counterclockwise direction during the operation of the retraction motor 251.

It should be observed that the machine can be initially set up so that the active edge of the grinding wheel 111 will be located any predetermined distance from the center line of the work at the instant at which the throw of the lever 102 is arrested by engagement of the dog 309 with the pin 310 to institute the automatic cycle, as described above. In other words, the initial depth of cut for the grinding wheel during the first stroke of the work slide 47 can be predetermined as desired. For this purpose the size-determination wheel 83 (Fig. 8) is turned to adjust the position of the wheel slide 40 on the taper slide 39, as heretofore described in connection with the manual operation of the machine. The position of the wheel slide on the taper slide determines, of course, the displacement of the active edge of the grinding wheel with respect to the work when the taper slide is drawn forward to the fixed position determined by the engagement of the dog 309 with the pin 310. In this way precision adjustment through the hand wheel 83 can be made for the initial depth of cut. The final depth of cut is similarly limited by the full-forward stop position of the taper slide, i. e. by the stop engaging the handle 102 in its full speed position, and the amount of each increment of infeed between the initial and final depths of cut is predetermined by the setting of the ratchet guard 272, as heretofore described.

In the course of the foregoing description reference has been made to the operation of limit switches LS4, 5, 6 and 7. Of the other three limit switches provided, LS1 is actuated when the work slide 47 reaches the respective opposite ends of its predetermined path of travel. For this purpose, the switch LS1 is mounted on the bed adjacent the work slide 47 (Figs. 1 and 15) and has a pivoted operating lever 317 arranged with its upper end projecting between spaced dogs 318 adjustably mounted on the side of the work slide. These dogs engage the lever 317 and actuate the switch LS1 to its alternative positions at respective opposite ends of the path of travel for the work slide. The limit switches LS2 and LS3 are, on the other hand, associated with the dresser mechanism 25 and are arranged to be actuated by dogs (not shown) at respective opposite terminals of the movement of the dresser parts.

A number of manually operable switches are also included in the control apparatus to facilitate various selection operations with respect to the cycle and to institute the operation not only of the cycle as a whole, but of various ones of the motors used in it when the machine is being operated by manual rather than cyclic control. These switches may be mounted at any convenient point or points on the machine, such, for example, as on a panel 320 adjacent the operator's station at the front of the machine (Fig. 1), and they include (see Fig. 20); a normally open cycle "start" push button switch M1, a normally closed cycle "stop" push button switch M2, a two-position selector switch M3 for determining the direction of rotation of the work feed motor 31 in conformity with the helix direction of the interchangeable master lead screw 171, the setting of the switch M3 depending upon whether this master lead screw has a right or left hand thread, a pair of two-position selector switches M4 and M5 for respectively determining the speed of the work slide 47 during its forward and reverse or right and left hand strokes, mechanically interconnected push button switches M6, M7 (both switches being closed when the button for M6 is depressed and both switches being open when the button for M7 is depressed) to condition the work slide 47 for continuous reciprocation when the button M6 is depressed and for single stroke reciprocation initiated in a direction selected by the two-position selector switch M8 when the button M7 is depressed, a push button "start" switch M9 and an on-off switch M10 included in the controls of the dresser drive motor 29, a normally open push button switch M11 and a normally closed push button switch M12 serving respectively to start and stop the coolant pump motor 26a and grinder drive motor 26,
a normally open push button "start" switch M13 and an on-off switch M14 also included as alternative control switches for the dresser drive motor 29, a normally closed push button switch M15 serving as an "emergency stop" control for the machine, a two-position selector switch M16 which conditions the machine alternatively either for full automatic or manual control, and a main disconnect switch M17. The purpose of the solenoid 1S has been heretofore described. Also, associated with the coolant system, is a solenoid 2S arranged when energized to open a delivery valve from the coolant pump to effect delivery of liquid coolant to the grinding wheel 111 in the usual manner.

A plurality of relays and contactors 1R to 17R, both inclusive, are included in the system (Fig. 20). These relays have various normally open and closed contacts which have been identified by the relay's indicia plus a sparate number for each contract. Thus the relay 1R has contacts 1R1, 1R2, etc. Each set of contacts for each relay is shown juxtaposed to its actuating winding and also at its proper place in the circuit. By way of identification it may be noted that 1R and 2R are the respective forward and reverse contactors for the dresser drive motor 29; 3R is the "run" relay for the work slide feed motor 31; 4R and 5R are respectively the forward and reverse contactors for the work feed motor 31; 6R and 7R are respectively the forward and reverse plugging relays for the work feed motor; 8R is the pump and wheel drive motor contactor; 9R and 10R are the speed control relays for the work feed motor 31; and 11R, 12R, 13R and 14R are arranged to effect the automatic grinder feed operation during dwell periods at the end of each work slide stroke and restarting of the work slide in the course of automatic cycling. As to the latter group of relays note that relay 11R is a dashpot type time delay relay. Relay 15R and contactor 16R govern the operation of the retraction motor 251, while relay 17R governs the operation of the coolant valves operating solenoid 2S.

Associated with each of the motors 29, 250, 251 (see Fig. 20) is a normally engaged brake (not shown) of conventional form arranged to be disengaged by a corresponding actuating solenoid 3S, 4S and 5S, respectively, when the associated motors are energized. These brakes serve promptly to arrest rotation of the associated motors when the latter are open circuited. Effectual stoppage of the work feed motor 31 is accomplished by plugging it through the use of a plugging switch PS of conventional form, as hereinafter described. Coasting of the other motors 26 and 26a being unobjectional, it is unnecessary to provide means for mechanically or electrically braking them.

Electric control circuits

Upon reference to Fig. 20, it will be observed that current is supplied for all of the various motors from three main supply lines $L_1, L_2, L_3$, which are connected to a suitable source of three-phase alternating current by the main disconnect switch M17. Suitable lower voltage current for the control circuit proper is derived from a step-down transformer 400 having a primary winding connected across the supply lines $L_1, L_2$ and a secondary winding with a lead $L_4$ connected to one terminal and leads $L_5$ and $L_6$ connected to the other terminal. Accordingly the control devices may be energized by connecting them across either the lines $L_4, L_5$ or $L_4, L_6$.

As a preliminary to either automatic or manually controlled operation, the push button M11 is momentarily closed to start the grinder wheel drive motor 26 and the coolant pump motor 26a. Such momentary closure of the push button M11 energizes the contactor 8R (through a circuit L₆—M12—M11—8R—L₄) and this contactor is sealed in by closure of its contacts 8R1 in shunt with the push button M11. Its remaining contacts 8R2, 8R3, 8R4 close to connect the motors 26 and 26a to the supply lines L₁, L₂, L₃. The motors 26 and 26a thus run continuously although coolant is not actually delivered by the coolant pump to the grinding wheel until the valve-actuating solenoid 2S is energized in the manner hereinafter described. To stop the motors 26, 26a at any time it is necessary simply to momentarily depress the "stop" push button M12 whereupon the contactor 8R is dropped out.

Assuming that the operator wishes to run the machine on its automatic cycle, the selector switch M16 is turned to the left to the position shown in Fig. 20. As a further preliminary the operator shifts the speed selection switches M4 and M5 to condition the machine for the work slide feed speeds which he desires. As to this latter, it will be observed that when the selector M4 is turned to the left, as shown, the relay 9R is conditioned for energization upon closure of contacts 4R5 on the "forward" contactor 4R of the motor 31, and when it is finally energized its contacts 9R1, 9R2, 9R3, 9R4 and 9R5 are closed in the supply circuit of the work feed motor 31. Similarly when the selector M5 is turned to the position shown, it also conditions the circuit of the relay 9R for subsequent completion upon closure of contacts 5R5 of the "reverse" contactor 5R. On the other hand when either of the selectors M4 or M5 is turned to its right hand position the relay 10R is conditioned for subsequent energization by the contacts 4R5 and 5R5 of the respective direction contactors of the motor. This latter relay 10R has three contacts 10R1, 10R2 and 10R3 interposed in the supply circuit of the work feed motor 31 and which are closed when the relay 10R is picked up. The effect on the motor 31 of the two relays 9R and 10R may be conveniently noted at this point. The motor 31 is of a conventional two-speed type and operates at low speed when supplied with current through leads 401 and with the windings connected to leads 402 shorted, and operates at high speed when supplied with current through leads 402 and with the leads 401 open. Accordingly, when the relay 9R is picked up and the relay 10R is out the motor will operate at low speed while on the other hand when the relay 10R is picked up and the relay 9R is out the motor will operate at high speed. In view of the relation noted above of the selectors M4 and M5 to the direction contactors 4R, 5R, the setting of the selector M4 determines the speed of the motor 31 when the latter is operating in a forward direction while the selector M5 determines the speed when the motor is operating in its reverse direction. In this way the setting of the switches M4 and M5 can be used to control independently the speed of the work slide 47 for the two opposite directions of traverse. It will be assumed in the succeeding description, that the selectors M4 and M5 are left set for low speed operation of the slide in both directions.

With the grinder drive and coolant pump motors 26 and 26a running and the selectors M4, M5 and M16 set in their left hand positions as shown, the operator may initiate cyclic operation of the machine either by momentarily closing the "start" push button M1 or by swinging the lever 102 in an infeed direction until the limit switch LS5 is closed, through the mechanical connection heretofore described. In tracing the operation of the various circuit elements in the succeeding description it will be found helpful to follow the various steps on the chart comprising Fig. 21. In this chart a black rectangle, in the columns headed by the indicia of the various relays and solenoids, indicates that the corresponding device is energized at that particular step or point in the cycle while a white rectangle indicates that they are deenergized. The two shaded rectangles show that the time delay relay 11R is energized but not yet picked up.

Upon closure of the "start" push button M1 the "run" relay 3R is energized (through a circuit L₆—M2—M1—403—7R1—6R1—3R—L₄) and is sealed in by closure of its contacts 3R1, 3R2 in shunt with M1. The "run" relay 3R in turn energizes the preparatory relay 15R (through a circuit L₆—M2—404—M16—405—LS6a—3R4—15R—L₄)

for a purpose which will appear later, and the "forward" contactor 4R for the work feed motor 31 (through a circuit L₅—M2—404—3R1—406—13R1—
14R4—407—LS1a—M3—M6—5R7—4R—L₄).

Energization of the "forward" contactor 4R causes it to close its main contacts 4R1, 4R2, 4R3 in the circuit of the work feed motor 31, and the supply connections are completed to the latter through the contacts of "slow" relay 9R which is picked up by closure of contacts 4R5. Such energization of the contactor 4R also causes it to close its contacts 4R4 to pick up the valve-controlling relay 17R (through a circuit L₆—M2—404—16R1—4R4—17R—L₄) so that this relay closes its contacts 17R1 in shunt with the contacts 4R4 to seal itself in and its contacts 17R2 to energize the solenoid 2S so that the latter will open the valve for delivery of coolant to the grinding wheel. It should also be noted that the main contactor 4R closes its contacts 4R6 in the circuit of its plugging relay 6R preparatory to energization of the latter, and opens its normally closed interlock contacts 4R7 in the circuit of the companion or "reverse" contactor 5R so that the latter cannot be inadvertently energized simultaneously with the contactor 4R. With the supply circuit for the motor 31 thus completed by its "forward" contactor 4R it begins to move the work slide 47 forwardly.

As soon as the work feed motor 31 begins to revolve in its forward direction, it throws the plugging switch PS so that the latter bridges its contacts a, b thereupon energizing the plugging relay 6R (through a circuit L₆—PSab—13R2—4R6—6R—L₄)

Picking up this plugging relay 6R prepares the circuits for plugging of the motor 31 at the end of the forward stroke of the work slide which is in progress at this point. The plugging relay 6R seals itself in by closing its contacts 6R8 in shunt with contacts 4R6 and 13R2.

Picking up the plugging relay 6R also preliminarily conditions the circuits for a subsequent incremental infeed of the grinding wheel by the grinder feed motor 250 at the end of the feed stroke of the work slide which is in progress. For this purpose the relay 6R closes its contacts 6R4 to pick up the time delay relay 11R (through a circuit

L₅—M2—404—M16—405—
6R4—408—409—11R—L₄)

Incidentally, it is well to observe here that the time delay of the relay 11R is not used in timing the dwell during which the infeed takes place but is used solely in preventing undesirable oscillation of the armature of the motor 31 when it is plugged, as will later appear. After a suitable time interval of, say, one second, the relay 11R closes its contacts 11R1 to energize the relay 12R (through a circuit

L₅—M2—404—M16—405—6R4—11R1—12R—L₄)

The relay 12R in turn picks up the relay 13R by closure of its contacts 12R1, the relay 13R being energized through a circuit L₅—M2—404—M16—405—
LS1a—3R3—12R1—13R—L₄

Thereupon the relay 13R seals itself in by closing its contacts 13R4 in shunt with the contacts 12R1. This picking up of the relay 13R is simply preparatory to the subsequent infeed step in the cycle and does not have any immediate result. It is to be noted at this point also that the resultant opening of the contacts 13R1 does not drop out the "forward" contactor 4R since an alternative energizing circuit for the latter was established when the plugging relay 6R picked up and closed its contacts 6R5, 6R6, namely, the circuit L₅—M2—404—6R5—6R6—407—
LS1a—M3—M6—5R7—4R—L₄

Similarly opening of the contacts 13R2 does not drop out the plugging relay 6R since its contacts 6R8 have previously closed in shunt about the contacts 13R2.

As a further preliminary for the subsequent infeeding of the grinder, the picking up of the relay 12R noted above not only picks up 13R but also closes its contacts 12R2 so that solenoid 1S is energized (contacts 17R2 having previously closed as noted above). Energization of this solenoid causes it to withdraw the pin 310 (see Fig. 15) so that the dog 309 is freed and the disk 289 can be rotated by the grinder feed motor 250 when the latter is energized at the proper time.

As so far described, the work feed motor 31 is in operation in a forward direction and the circuits are all prepared for plugging of this motor at the end of the forward stroke of the table and for establishing an infeed operation during a dwell at the end of such stroke. The continued forward operation of the motor 31 is interrupted at the end of the forward stroke for the work slide 47 by shifting of the limit switch LS1. As a result of the latter action the contacts LS1a are opened and contacts LS1b are closed. Thereupon the energizing circuit previously noted for the "forward" contactor 4R is interrupted so that this contactor drops out although the "run" relay 3R stays in. When the contactor 4R thus opens the closure of its normally closed interlock contacts, contacts 4R7 complete a circuit for the companion "reverse" contactor 5R, previously prepared by closure of the plugging relay's contacts 6R7, so that the contactor 5R is energized (through a circuit L₅—410—6R7—4R7—5R—L₄). Such closure of the "reverse" contactor 5R causes it to close its main contacts 5R1, 5R2 and 5R3 so that the motor 31 is energized for reverse rotation. In this way the motor is braked quickly to standstill. As soon as there is any sensible reversal of the motor 31, the plugging switch PS is thrown to bridge the contacts c, d and interrupt the previous connection between its contacts a, b. Thereupon the energizing circuit of the plugging relay 6R is opened and the "reverse" contactor 5R is dropped out by opening of the contacts 6R7 and the motor 31 deenergized and at rest. Observe here that since the contacts 6R4 of the plugging relay 6R open, the relays 11R and 12R drop out in sequence. However, 11R cannot go out until after its time interval and hence 13R cannot go out to reclose its contacts 13R2, 13R3 until after this time interval. Accordingly, danger is avoided of inadvertently picking up 6R again if the plugging switch PS should swing back and forth due to oscillation of the motor 31. Hence, no matter what the effect of various weights of workpieces may be on the natural period of this plugged motor, 6R or 7R will not inadvertently be reclosed.

The opening of the plugging relay 6R, noted above, after the work feed motor 31 has been brought to rest, serves to initiate operation of the grinder feed motor 250. Thus when the plugging relay 6R drops out it recloses its normally closed contacts 6R2 so that the grinder feed motor contactor 14R is energized (through a circuit L₅—M2—404—M16—405—7R2—6R2—13R5—14R—L₄). This sets the grinder feed motor 250 in operation by closure of the contacts 14R1, 14R2, 14R3 so that it executes the incremental grinder feed cycle heretofore described in which its stroke disk 253 is revolved one full revolution (see Fig. 19). As the grinder feed motor 250 revolves, it throws the limit switch LS7 as heretofore noted thereby opening the contacts LS7a and closing the contacts LS7b. Opening of the contacts LS7a drops out the intermediate relay 13R but closing of the contacts LS7b holds the contactor 14R in. Control of the contactor 14R is thus shifted from its associated relay 13R to the limit switch LS7. Hence, the relay 14R stays in until the motor 250 has turned its stroke disk 253 through a full revolution whereupon the limit switch LS7 is thrown back to its original position, opening the contacts LS7b and dropping out the relay 14R to stop the motor 250. The incremental feed of the grinder wheel toward the work required at the end of the work slide stroke is thus complete.

Restoration of the limit switch LS7 to its original position not only stops the grinder feed motor 250 but also institutes operation of the work feed motor 31 in an opposite or reverse direction so as to move the work slide 47 through a return stroke. Thus, when the grinder feed motor relay 14R drops out it recloses its contacts 14R4 whereupon the "reverse" contactor 5R is picked up (through a circuit L₅—M2—404—3R1—406—13R1—14R4—407—LS1b—M3—M7—4R7—5R—L₄). Thereupon a contactor 5R closes its main contacts 5R1, 5R2, 5R3 and closes its contacts 5R5 to pick up the "slow" relay 9R and, hence, connect the work feed motor 31 to the supply lines L₁, L₂, L₃. As soon as the motor 31 gets under way in its reverse direction the plugging switch PS bridges its contacts c, d thereby picking up the reverse plugging relay 7R (through a circuit L₅ — PScd — 13R3 — 5R6 — 7R — L₄). Thereupon the plugging relay 7R closes its contacts 7R8 to complete a sealing circuit for itself about contacts 13R3, 5R6 and closes its contacts 7R5, 7R6 to complete an energizing circuit for the contactor 5R independent of contacts 14R4 and 13R1. Additionally the plugging relay 7R closes its contacts 7R4 to pick up the time delay relay 11R. When the latter relay closes after its predetermined time interval the preparatory relays 12R and 13R close in preparation for the subsequent infeed cycle identical with that previously described as taking place at the end of the forward stroke of the work slide.

The work feed motor 31 thus continues to run in its reverse direction until the reverse stroke of the work slide 47 is completed. Upon completion of this stroke the limit switch LS1 is thrown so as to open contacts LS1b and close contacts LS1a. Thereupon the reverse contactor 5R is dropped out and the plugging relay 7R cuts in the contactor 4R to plug the motor and the contactor 4R is finally dropped out by the plugging switch PS in the same general manner as previously described in connection with the termination of the forward stroke of the work slide. Also as soon as the plugging relay 7R finally drops out the grinder feed motor relay 14R is picked up by closure of contacts 7R2 and the grinder feed motor 250 started in operation. The same infeed cycle as heretofore described is repeated under the control of the limit switch LS7. When the latter is finally restored to its initial position the next forward feeding stroke of the work slide is instituted.

The steps of operation described above are repeated and continued so as to produce strokes of the work slide 47 in opposite directions with a dwell between each stroke during which an incremental infeed of the grinding wheel takes place. It should be observed incidentally, that the opening solenoid 2S for the coolant valve remains energized during all of this time since the relay 17R stays energized until the retract motor contactor 16R picks up (see chart in Fig. 21) so there is no danger arising from lack of coolant at any time despite the dwell periods noted.

The stroking operation of the work slide 47 continues as above until the increments of infeed, intermediate the successive work slide strokes, total a predetermined amount corresponding to the preliminary setting of the size control wheel 83. When this last increment of infeeding has been made, the cam 305 (see Fig. 19) causes the limit switch LS4 to be thrown, through the mechanical connection previously described, so that it opens its contacts LS4a and closes its contacts LS4b. Despite the throwing of this limit switch LS4, the subsequent stroke of the work slide is completed. After that last stroke is completed, however, it will be found that the actuated limit switch LS4 has preliminarily set up the circuits in such manner that the work feed motor 31 will be finally stopped and no further operation of the grinder feed motor 250 will take place. Furthermore, the second main part of the automatic cycle, namely, retraction of the grinder and dressing of the wheel is instituted.

In particular, at the beginning of the next work slide stroke the "run" relay 3R will be in even though 4LSa is open, being energized through

L₅—M2—404—LS5—7R1—6R1—3R—L₄

Hence, the direction contactor 4R or 5R, as the case may be, can pick up to start the last slide stroke. As soon as the motor 31 gets under way, however, the resulting energization of the plugging relay 6R or 7R interrupts the circuit noted for 3R so that it goes out and stays out until the operator begins a whole new cycle. The direction contactor (4R or 5R) will stay in, once it is in, for the remainder of the stroke even though the "run" relay does drop out but the direction relays cannot be picked up again for any further slide strokes until the operator presses button M1 or closes LS5 to pick up 3R and start a new cycle. At the end of the last stroke the motor 31 is plugged to a stop in the usual manner. However, no further infeed cycle will be instituted at the end of this last plugging operation because the open contacts 3R3 of the "run" relay 3R hold out the relay 13R and hence the grinder feed motor contactor 14R.

When the work slide 47 finally comes to rest, as noted above, with both of the plugging relays 6R and 7R out, the grinder retract motor's contactor 16R is picked up (through a circuit L₅—M2—404—M16—405—15R2—
            LS4b—3R5—7R3—6R3—16R—L₄)

Observe that the intermediate relay 15R has remained energized even though the "run" relay 3R, which picked it up initially has dropped out, since its sealing contacts 15R1 are in shunt with the contacts 3R3 which initially completed its energizing circuit.

Such energization of the contactor 16R causes it to close its main contacts 16R3, 16R4, 16R5 to start the grinder retract motor 251. It also closes its sealing contact 16R2 in shunt with the limit switch contacts LS4b. Shortly after the rotation of the grinder retract motor 251 has been instituted, the limit switch LS6 is shifted to open its contacts LS6a and close its contacts LS6b. This drops out the relay 15R but does not drop out the contactor 16R since the latter will now be energized through the switch contacts LS6b instead of the relay contacts 15R2. In effect, the control of the contactor 16R is shifted from the relay 15R to the limit switch LS6. Accordingly, when the latter limit switch is restored to its initial position after the retraction of the grinder is complete, the contactor 16R is deenergized and the grinder retract motor 251 stopped.

Through the medium of the mechanical interconnection heretofore described, the grinder retract motor 251 also turns the dresser feed shaft 120 (Fig. 8) so as to feed the dresser mechanism 25 through a predetermined increment of distance preparatory to dressing the grinding wheel 111. When the contactor 16R opens its normally closed contacts 16R1, it drops out the relay 17R and thereby deenergizes the solenoid 2S so that the supply of coolant to the grinder wheel is cut off. Picking up of the contactor 16R also initiates operation of the dresser mechanism 25 by the dresser drive motor 29. In this connection, observe that when the contactor 16R picks up it closes its contact 16R6, thereby energizing one of the dresser drive motor's contactors 1R (through a circuit

L₅—M10—M14—16R6—
            15R3—2R1—1R—LS2—L₄)

This causes the contactor 1R to close its main contacts 1R2, 1R3, 1R4 to start the dresser drive motor 29 and also to close its sealing contacts 1R5 so that the contactor 1R will remain energized even after the contactor 16R drops out. A pilot light P1 in shunt with the actuating winding of the contactor 1R shows when it is on, as does a pilot light P2 show when the other or reverse dresser motor contactor 2R is on. The dresser drive motor 29 continues to run under the control of its contactor IR until the limit switch LS2 is opened and the other limit switch LS3 closed. Thereupon, the other dresser motor contactor 2R is energized (through a circuit L₅—M10—M14—IR1—2R—LS3—L₄) closing its main contacts 2R2, 2R3, 2R4 to energize the motor 29 with a phase-reversed voltage for rotation in the opposite direction. The dresser motor continues to operate in this reverse direction until the limit switch LS3 is reopened, dropping out the contactor 2R. The simultaneous reclosure of the limit switch LS2 cannot again pick up the first contactor IR, however, since its circuit is now open at 16R6 and IR5. Accordingly, the machine comes to rest with all of the switching mechanism in its initial condition.

During the dressing of the grinding wheel III the operator can remove the finished workpiece and insert a fresh blank. Thus when the dressing is complete he has only to throw the handle 102 in an infeed direction to close the switch LS5 and the machine is off again on its automatic cycle of operation. It will thus be seen that operator attention is reduced to a minimum.

To stop the machine in the event of an emergency the operator has only to open the emergency stop switch M15 momentarily. This opens the line L₅ and kills all of the relay and contactor circuits except that for the pump and wheel drive motors 26a, 26 so that motors 31, 29, 250 and 251 are stopped no matter what the point in the cycle may be. Further safety is afforded by the quick retract lever 102 which, when thrown to its retract position, pulls the grinding wheel clear of the work. The usual overload relays (not shown) may be provided for protection of the various motors.

In some instances it may be desirable to operate the machine under manual control rather than cyclicly. In such case the selector switch M16 is turned to the right from the position shown in Fig. 20. This renders the push button switches M1, M2 effective to start and stop the work feed motor 31 through the medium of reversing contactors 4R, 5R and plugging relays 6R, 7R but cuts out of circuit the feed-institution or intermediate relays 11R, 12R and 13R so that no infeeding of the grinding wheel will be initiated after each work slide stroke nor will there be any automatic starting of the dresser motor 29.

Two types of manually controlled work slide operation are available, however, with the main selector M16 turned to the right as noted. First, it may be continuously reciprocated back and forth or, second, it may be traversed through one stroke and then stopped automatically. For the first or continuous reciprocation operation the push button M6 is depressed as shown. In such case, momentary closure of the "start" button M1 will cause the slide 47 to be traversed back and forth until stopped by opening of the "stop" switch M2. For the second or single stroke type of operation the push button M7 is depressed. Then the selector M8 is thrown to the left as shown for "forward" motion of the slide 47 or to the right for "reverse" traversing, picking up respectively the main contactors 4R and 5R. At the end of such a stroke the limit switch LS1 is thrown and the motor 31 is plugged and remains deenergized until restarted.

Neither the grinder feed or grinder retract motors 250, 251 are used during non-cyclic operation. Instead the operator turns the retract handle 102, size wheel 83 and dresser feed wheel 122 (Fig. 8) to effect the desired adjustments. The dresser motor 29 can, however, be used to drive the dresser mechanism 25 and, of course, the pump motor 26a and wheel drive motor can be started or stopped at any time required by their control switches M11, M12.

To start the dresser motor 29, both of the on-off switches M10, M14 must be in their "on" positions as shown (Fig. 20). Then upon depressing either of the push buttons M9, M13 (available at remote points on the machine for maximum convenience) the dresser motor's forward replay IR will pick up and start the motor. When LS2 opens and LS3 closes, contactor IR goes out and 2R comes in, as described above, and finally the motor 29 stops when 2R drops out upon reopening of LS3.

I claim as my invention:

1. In a grinder, the combination of work and tool supports, a rotatable grinding tool on said tool support, power actuated means for effecting a relative infeeding movement between said supports, positive stop means for limiting the relative infeeding motion of said supports, manually operable means for infeeding said supports until such motion is arrested by said stop means, second power actuated means for effecting a relative stroking feed movement between said supports in a direction transverse to said infeed movement, and control means for disabling said stop means in response to stroking feed of said supports by said second power actuated means to thereby permit subsequent infeeding by the first mentioned power actuated means from the initial point determined by said stop means.

2. In a grinder, the combination of work and tool supports, a rotatable grinding tool on said tool support, power actuated means for effecting a relative infeeding movement between said supports, a withdrawable stop for limiting the relative infeeding motion of said supports, means including a solenoid operable when energized to withdraw said stop from operative position, manually operable means for infeeding said supports until such motion is arrested by said stop, second power actuated means including an electric motor for effecting a relative stroking feed movement between said supports in a direction transverse to said infeed movement, and means operable upon energization of said electric motor for energizing said solenoid to withdraw said stop and thereby permit subsequent infeeding by the first mentioned power actuated means from an initial point determined by the stop.

3. In a grinder, the combination of work and tool supports, a rotatable grinding tool on said tool support, power actuated means for effecting a relative infeeding movement between said supports, positive stop means for limiting the relative infeeding motion of said supports, manually operable means for infeeding said supports until such motion is arrested by said stop means, second power actuated means for effecting a relative stroking feed movement between said supports in a direction transverse to said infeed movement, and control means for disabling said stop means in response to stroking feed of said supports by said second power actuated means to thereby permit the first mentioned power actuated means to effect an infeed of said supports from the initial point determined by said stop means and for rendering said first mentioned power actuated means operable to effect an incremental relative infeed of said supports in response to the execution of predetermined amounts of the stroking feed effected by the second power actuated means.

4. In a grinder, the combination of work and tool supports, a rotatable grinding tool on said tool support, power actuated means for effecting a relative infeeding movement between said supports, positive stop means for limiting the relative infeeding motion of said supports, manually operable means for infeeding said supports until such motion is arrested by said stop means, second power actuated means for effecting a relative stroking feed movement between said supports in a direction transverse to said infeed movement, control means for disabling said stop means in response to stroking feed of said supports by said second power actuated means to thereby permit the first mentioned power actuated means to effect an infeed of said supports from the initial point determined by said stop means and for rendering said first mentioned power actuated means operable to effect an incremental relative infeed of said supports in response to the execution of predetermined amounts of the stroking feed effected by the second power actuated means, and means operable in response to relative retraction of said supports in a direction opposite to their infeed movement for automatically resetting said stop means in operative position.

5. In a grinder, the combination of work and tool supports, a rotatable grinder on said tool support, power actuated means for effecting a relative infeeding movement between said supports toward each other, manually operable means for initially relatively adjusting said supports toward each other, positive stop means for arresting the manual relative adjustment of said supports toward each other to fix the point at which the subsequent power actuated infeeding of them shall begin, a second power actuated means for effecting a relative stroking feed movement between said supports in a direction transverse to said infeed movement, control means for initiating operation of said second power actuated means to effect said stroking feed in response to engagement of said stop means as said supports are infed toward each other by said manual means and for disabling said stop means as the stroking feed commences to thereby permit subsequent infeeding by the first mentioned power actuated means.

6. In a grinder, the combination of work and tool supports, a rotatable grinder on said tool support, power actuated means for effecting relative infeeding movement between said supports toward each other, manually operable means for initially relatively adjusting said supports toward each other, positive stop means for arresting the manual relative adjustment of said supports toward each other to fix the point at which the subsequent power actuated infeeding shall begin, a second power actuated means for effecting a relative stroking feed movement between said supports in a direction transverse to said infeed movement, control means for initiating operation of said second power actuated means to effect said stroking feed in response to engagement of said stop means as said supports are infed toward each other by said manual adjusting means and for disabling said stop means after the stroking feed commences to thereby permit subsequent infeeding by the first mentioned power actuated means and for causing said first mentioned power actuated means to effect predetermined successive increments of infeed of said supports in response to the execution of predetermined amounts of the stroking feed effected by the second power actuated means.

7. In a grinder, the combination of work and tool supports, a rotatable grinding tool on said tool support, power actuated means for effecting a relative infeeding movement between said supports, positive stop means for limiting the relative infeeding motion of said supports, manually operable means for infeeding said supports until such motion is arrested by said stop means, a second power actuated means for effecting a relative stroking feed movement between said supports in a direction transverse to said infeed movement, control means for disabling said stop means in response to stroking feed of said supports by said second power actuated means to thereby permit subsequent infeeding by the first mentioned power actuated means from an initial point determined by said stop means, and a third power actuated means for effecting a quick-retraction relative movement of said supports away from each other in a direction opposite to said infeed movement and for simultaneously rendering said stop means operative again.

8. In a grinder, the combination of work and tool supports, a rotatable grinding tool on said tool support, power actuated means for effecting a relative infeeding movement between said supports, positive stop means for limiting the relative infeeding motion of said supports, manually adjustable means for varying the displacement between said supports at the point where they are arrested in relatively moving toward each other by said stop means, manually operable means for relatively infeeding said supports until such motion is arrested by said stop means, second power actuated means for effecting a relative stroking feed movement between said supports in a direction transverse to said infeed movement, control means for disabling said stop means in response to stroking feed of said supports by said second power actuated means to thereby permit subsequent infeeding by the first mentioned power actuated means from an initial point determined by said stop means, and means for disabling said first mentioned power actuated means against effecting further relative infeeding of said supports in response to completion of a predetermined amount of infeeding from the initial point determined by said stop means.

9. In a grinder, the combination of work and tool supports, a rotatable grinding tool on said tool support, power actuated means for effecting a relative infeeding movement between said supports, positive stop means for limiting the relative infeeding motion of said supports, manually adjustable means for varying the displacement between said supports at the point where they are arrested in relatively moving toward each other by said stop means, manually operable means for relatively infeeding said supports until such motion is arrested by said stop means, second power actuated means for effecting a relative stroking feed movement between said supports in a direction transverse to said infeed movement, and control means for disabling said stop means in response to stroking feed of said supports by said second power actuated means to thereby permit subsequent infeeding by the first mentioned power actuated means from an initial point determined by said stop means.

10. A grinding machine comprising, in combination, a reciprocable work table, a first slide reciprocable in a path transverse to that of the table, a second slide on the first slide and reciprocable on it in a path paralleling that of the latter, a rotatable grinding tool on said second slide, a stop for positively limiting the infeeding movement of said first slide toward said table, manually operable adjusting means for varying the position of said second slide relative to the first to thereby adjust the displacement of the tool from a workpiece on the table when said first slide is held against said stop, first power actuated means for effecting an infeeding movement of said first slide toward said table, carrying with it the second slide and tool, second power actuated means for reciprocating said table to move a workpiece on it back and forth past the tool, and control means responsive to the institution of table movement by said second power actuated means for disabling said stop to permit subsequent infeeding of said first slide by said first power actuated means from the initial position determined by said stop.

11. A grinding machine comprising, in combination, a reciprocable work table, a first slide reciprocable in a path transverse to that of the table, a second slide on the first slide and reciprocable on it in a path paralleling that of the latter, a rotatable grinding tool on said second slide, a stop for positively limiting the infeeding movement of said first slide toward said table, manually operable adjusting means for varying the position of said second slide relative to the first to thereby adjust the displacement of the tool from a workpiece on the table when said first slide is held against said stop, first power actuated means for effecting an infeeding movement of said first slide toward said table, carrying with it the second slide and tool, second power actuated means for reciprocating said table to move a workpiece on it back and forth past the tool, and control means responsive to the institution of table movement by said second power actuated means for disabling said stop to permit subsequent infeeding of said first slide by said first power actuated means from the initial position determined by said stop and for causing said first power actuated means to effect successive increments of infeed movement of said first slide from its initial position determined by said stop upon the completion of the execution by said table of successive strokes of reciprocation.

12. A grinding machine comprising, in combination, work and tool supports, a rotatable grinding wheel on the tool support, means mounting said supports for relative reciprocation in a path for a stroking feed in which a workpiece on the work support moves past the tool and for an infeed movement in a second path transverse to the first mentioned path, a third support having a dresser device thereon and movable relative to said tool support in a path to bring said dressing device into dressing engagement with the tool, power actuated means for effecting relative movement of said supports in said paths, and control means operable upon initiation of the operation thereof to cause said power actuated means to effect relative movement between said supports to execute a complete cycle of movement in which the stroking feed is effected with a period of dwell at the end of each stroke thereof and an infeed movement made during the periods of dwell between successive strokes of the stroking feed until a predetermined total of infeeding has been accomplished and after the next succeeding stroke of the stroking feed the latter is stopped and the tool support retracted and the dressing device support fed to bring the dressing device into dressing engagement with the tool.

13. In a grinding machine, the combination of a work support and a tool support, a rotatable grinding tool on said tool support, first power actuated means for effecting a reciprocatory relative feeding movement between said supports in a direction to reciprocate one of the supports back and forth past the other, second power actuated means for effecting a relative infeeding movement of said supports toward each other in a direction transverse to the path of said stroking feed, and control means for automatically arresting said stroking feed at the end of each stroke thereof, for initiating operation of said second power actuated means to effect a predetermined increment of infeed in response to each such stoppage of the stroking feed until a predetermined total amount of infeeding has been accomplished, for restarting said first power actuated means for another stroke of stroking feed in response to the completion of each such increment of the infeed and for finally arresting both the stroking feed and the infeed at the end of the stroke following the last increment of infeed necessary to make up said predetermined total of infeed.

14. In a grinding machine, the combination of a work support and a tool support, a rotatable grinding tool on said tool support, first power actuated means for effecting a reciprocatory relative stroking feed movement between said supports in a direction to reciprocate one of the supports back and forth past the other, a second power actuated means for effecting a relative infeeding movement of said supports toward each other in a direction transverse to the path of said stroking feed, and control means for automatically arresting said stroking feed at the end of each stroke thereof, for initiating operation of said second power actuated means to effect a predetermined increment of infeed in response to each such stoppage of the stroking feed until a preselected total amount of infeeding has been accomplished and for restarting said first power actuated means for another stroke of stroking feed in response to the completion of each such increment of the infeed.

15. In a grinding machine, the combination of work and tool supports, a rotatable grinding tool on the tool support, means mounting said supports for relative reciprocation in a stroking feed path to move a workpiece on the work support past the tool while engaged with it and for relative infeeding movement toward each other in a second path transverse to the first or for retractive movement in such second path, a dresser having a dresser support movably mounted on said tool support for feeding movement of it to bring the dresser into dressing engagement with the tool, power actuated means for moving said supports in said paths, and cyclic control means operable upon the initiation of operation thereof to cause said power actuated means to effect a cycle of movement of said supports including a plurality of strokes of stroking feed with an infeed movement in timed relation thereto and a quick retraction movement after a predetermined infeed movement has been completed together with a feed of said dresser support coincident with said quick retraction movement.

16. In a grinding machine, the combination of work and tool supports, a rotatable grinding tool on the tool support, means mounting said supports for relative reciprocation in a stroking feed path to move a workpiece on the work support past the tool while engaged with it and for relative infeeding movement toward each other in a second path transverse to the first or for retractive movement in such second path, a dresser having a dresser support movably mounted on said tool support for feeding movement of it to bring the dresser into dressing engagement with the tool, power actuated means for moving said supports in said paths, a motor for actuating said dresser, and cyclic control means operable upon the initiation of the operation thereof to cause said power actuated means to effect a cycle of movement of said supports including a plurality of strokes of stroking feed with an infeed movement in timed relation thereto and a quick retraction movement after a predetermined infeed movement has been completed together with a feed of said dresser support coincident with said quick retraction movement and initiation of operation of said dresser motor subsequent to the initiation of the feed of the dresser support.

17. In a grinding machine, the combination of work and tool supports, a rotatable grinding tool on the tool support, means including a first electric motor for effecting a reciprocatory relative stroking movement between said supports in the course of which a workpiece on the work support moves back and forth past the tool, means including a second electric motor for effecting a relative infeeding movement of the supports toward each other in a direction transverse to the path of said stroking feed, and means including a third electric motor for effecting a quick-retraction motion of said supports away from each other in a path transverse to the path of said stroking feed.

18. In a grinding machine, the combination of work and tool supports, a rotatable grinding tool on the tool support, means including an electric motor for effecting a relative infeeding movement of the supports toward each other to engage the tool with a workpiece on the work support, and means including another electric motor for effecting a quick-retract motion of said supports away from each other in a direction opposite to that for said infeed movement.

19. In a grinding machine, the combination of work and tool supports, a rotatable grinding tool on the tool support, a dresser movably mounted on the tool support for movement into dressing engagement with the tool, means including an electric motor for effecting a relative infeeding movement of the supports toward each other to engage the tool with a workpiece on the tool support, and means including another electric motor for effecting a quick-retraction movement of said supports to free the tool from the workpiece and for substantially simultaneously moving the dresser into engagement with the tool.

20. In a grinding machine, the combination of work and tool supports, a rotatable grinding tool on the tool support, means including a first electric motor for effecting a relative infeed movement between said supports to move them toward each other, a first presettable means for predetermining the increment of infeeding movement accomplished by said first electric motor upon each successive energization thereof, a second presettable means for predetermining the total infeeding movement which said first electric motor is capable of accomplishing, and means including a second electric motor for effecting a quick retract movement between said supports to separate the same upon the completion of the total infeeding movement determined by the setting of said second presettable means.

21. In a grinding machine, the combination of work and tool supports, a rotatable grinding tool on the tool support, first actuating means including a first rotatable operating member for effecting relative retraction movement of said supports away from each other to free the tool from the work, a dressing device, means for movably supporting said dressing device on said tool support, a second actuating means including a second rotatable operating member for moving said dressing device toward the tool to bring it into dressing relation with the latter, and means including a single electric motor for turning both said first and second rotatable members to substantially simultaneously withdraw the tool from the work and to feed the dressing device into engagement with the tool.

22. In a grinding machine, the combination of work and tool supports, a rotatable grinding tool on the tool support, first actuating means including a first rotatable operating member for effecting relative retraction movement of said supports away from each other to free the tool from the work, a dressing device, means for movably supporting said dressing device on said tool support, a second actuating means including a second rotatable operating member for moving said dressing device toward the tool to bring it into dressing relation with the latter, an electric motor, a rack arranged to be reciprocated by said motor, switch means for automatically stopping said motor after each energization of the latter of a duration sufficient to complete a predetermined reciprocatory movement of said rack, two pawl and ratchet mechanisms operable to turn said first and second rotatable members respectively, and means connecting both of said pawl and ratchet mechanisms in driven relation with said rack to move said operating members in unison upon reciprocation of said rack by the motor.

23. In a grinding machine, the combination of a base, a table reciprocably mounted thereon, means for rotatably supporting a workpiece on said table for axial traverse therewith, a first slide, a second slide, a third slide, means for supporting said first, second and third slides in operative relation to said table for reciprocation transversely thereof, a rotatably driven grinding wheel mounted on said second slide for cutting engagement with the workpiece, wheel truing means mounted on said third slide for dressing the cutting surface of said grinding wheel, first power actuated means for infeeding said first slide toward said table, a second power actuated means for quickly retracting said first slide away from said table and for substantially simultaneously moving said third slide to bring said truing means into engagement with the grinding wheel, and means actuated in response to movement of said third slide for moving said second and third slides relative to said first slide a distance equal to the length of movement of the third slide relative to the second slide.

24. In a grinding machine, the combination of a base, a table reciprocably mounted thereon, means for rotatably supporting a workpiece on said table for axial traverse therewith, a first slide, a second slide, a third slide, means for supporting said first, second and third slides in operative relation to said table for reciprocation transversely thereof, a rotatably driven grinding wheel mounted on said second slide for cutting engagement with the workpiece, wheel truing means mounted on said third slide for dressing the cutting surface of said grinding wheel, first power actuated means for infeeding said first slide toward said table, a second power actuated means for quickly retracting said first slide away from said table and for substantially simultaneously moving said third slide to bring said truing means into engagement with the grinding wheel, means actuated in response to movement of said third slide for moving said second and third slides relative to said first slide a distance equal to the length of movement of the third slide relative to the second slide, third power actuated means for reciprocating said table, and cyclic control means for causing said second power actuated means to infeed the first slide in timed relation with reciprocation of the table by the third power actuated means after a predetermined infeeding has been completed to stop both said first and third power actuated means and initiate the operation of said second power actuated means.

25. In a grinding machine, the combination of relatively reciprocable work and tool supports, a rotatable grinding tool on said tool support, power actuated means for effecting relative reciprocation of said supports, means including a manually operable device for initiating operation of said power actuated means, and control means including a selector which is presettable to condition the control means to cause said power actuated means either to effect a continuous relative reciprocation of said supports or a single stroke relative reciprocation thereof in response to each actuation of said manually operable device.

26. In a grinding machine, the combination of relatively reciprocable work and tool supports, a rotatable grinding tool on said tool support, first power actuated means for effecting relative reciprocation of said supports to move a workpiece on the work support to and fro past the tool, a second power actuated means for effecting a relative infeed movement between said supports in a path transverse to said reciprocation, a manually operable starting switch, a two-position selector, and control means operable when the selector is in one position to cause said first power actuated means to effect successive strokes of relative reciprocation of said supports with a dwell after each stroke and to cause said second power actuated means to effect an incremental infeed movement during each such dwell, all in response to a single momentary actuation of said switch, and operable when said selector is in its other position to cause said first power actuated means to effect one stroke of reciprocation and stop in response to each actuation of said switch, said second power actuated means remaining idle when said selector is in its second position.

27. In a grinding machine, the combination of relatively reciprocable work and tool supports, a rotatable grinding tool on said tool support, first power actuated means for effecting relative reciprocation of said supports to move a workpiece on the work support to and fro past the tool, a second power actuated means for effecting a relative infeed movement between the supports toward each other in a path transverse to said reciprocation, a manually operable starting switch, first and second two-position selectors, and control means operable when both selectors are in first positions thereof to cause said first power actuated means to effect successive strokes of relative reciprocation of said supports with a dwell after each stroke and to cause said second power actuated means to effect an incremental infeed movement during each such dwell, all in response to a single momentary actuation of said switch, and operable when said first selector is in its second position either to cause said first power actuated means to effect a continuous relative reciprocation of said supports upon an actuation of said switch or to effect only one stroke of such reciprocatory movement upon each actuation of the switch, depending upon whether said second selector is in its first or second position, said second power actuated means remaining idle when said first selector is in its second position.

28. In a grinding machine, the combination of work and tool supports, a rotatable grinding tool on the tool support, first power actuated means for effecting relative reciprocation between said supports to move a workpiece carried by the work support back and forth past the tool, a dressing device for the grinding tool, second power actuated means for actuating said dressing device, automatic control means operable to cause the execution of a cycle of operation in which the first power actuated means effects a relative reciprocation of the supports for grinding a workpiece carried by the work support and at the end of a preselected grinding operation stops the reciprocation and starts said second power actuated means to actuate the dressing device to dress the grinding tool, and manually operable means effective at any time in said cycle to interrupt the same, stop said first power actuated means and start the second power actuated means to dress the tool.

29. A grinding machine comprising, in combination, work and tool supports, a rotatable grinding tool on the tool support, means including a first electric motor for effecting a relative infeeding movement of said supports toward each other, means including a second electric motor for effecting a relative reciprocatory stroking feed movement between said supports in a path transverse to the path of said infeed movement, a manual cycle-start control device, means responsive to an actuation of said control device for energizing said second motor to effect said stroking feed movement, a relay operable when energized to effect energization of the first motor for infeeding of said supports, means responsive to completion of one stroke of said stroking feed for stopping said second motor and for energizing said relay to start said first motor, means including a two-position switch operable when moved from its first to its second position to deenergize said relay, though maintaining said first motor energized and when restored from its second position to its first position to then deenergize said first motor and restart said second motor, and means driven by said first motor for sequentially moving said switch from its first position to its second position and then back to its first position.

30. A grinding machine comprising, in combination, work and tool supports, a rotatable grinding tool on the tool support, means including a first electric motor for effecting a relative stroking feed movement of said supports to move a workpiece on the support to and fro past the grinding tool, means including a second electric motor for effecting a relative quick-retraction movement between said supports to separate them in a direction transverse to the path of stroking feed and thereby free the tool from the workpiece, manually operable means for initiating operation of the first motor, means including a relay operable when energized to energize said second motor, means responsive to the completion of a predetermined movement between said supports for deenergizing said first motor and for energizing said relay to start the second motor, means including a two-position switch operable when moved from its first to its second position to deenergize said relay though maintaining said second motor energized and when restored from its second position to its first position to then deenergize said second motor, and means driven by said second motor for sequentially moving said switch from its first position to its second position and then back to its first position.

31. A grinding machine comprising, in combination, work and tool supports, a rotatable grinding tool on the tool support, means including a first electric motor for effecting a relative stroking feed movement of said supports to move a workpiece on the work support to and fro past the grinding tool, a dresser mounted on a dresser slide movable on the tool support to bring the dresser into operative dressing engagement with the tool, means including a second electric motor for effecting a relative quick-retraction movement between said supports to separate them in a direction transverse to the path of stroking feed and thereby free the tool from the workpiece and for moving said dresser slide on said tool support to bring said dresser into engagement with the tool, manually operable means for initiating operation of the first motor, means including a relay operable when energized to energize said second motor, means responsive to the completion of a predetermined relative movement between said supports for deenergizing said first motor and for energizing said relay to start the second motor, means including a two-position switch operable when moved from its first to its second position to deenergize said relay though maintaining said second motor energized and when restored from its second to its first position to then deenergize said second motor, and means driven by said second motor for sequentially moving said switch from its first position to its second position and then back to its first position.

32. In a grinding machine, the combination of a reciprocable work support and a tool support mounted for cross-feed movement in a direction transverse to the path of reciprocation of said work support, first power actuated means for reciprocating said work support, second power actuated means for advancing said tool support step-by-step in timed relation with the reciprocation of said work support, means including a movable manual operating handle for advancing or retracting said tool support, control means for initiating the operation of said first power actuated means and for rendering the second power actuated means operative to function in timed relation with the work support reciprocation, a manually operable cycle-start device, and means for actuating said control means in response to either an actuation of said cycle-start device or to a predetermined movement of said handle.

33. In a grinding machine, the combination of a reciprocable work support and a tool support mounted for cross-feed movement in a direction transverse to the path of reciprocation of said work support, first and second power actuated means for respectively reciprocating said work support and feeding said tool support forward step-by-step in timed relation to the reciprocation of the work support, size control means including first and second positive stops for intercepting the forward movement of said tool support at points corresponding respectively to the displacement of it from the work support required at initiation and termination of said tool support's forward feed by said second power actuated means, means including a manual operating handle for effecting a quick approach of said tool support into engagement with said first positive stop, control means for initiating the operation of said first power actuated means and for rendering the second power actuated means operative to function in timed relation with the work support reciprocation, a manually operable cycle-start device, and means for actuating said control means in response to either an actuation of said cycle-start device or to a predetermined movement of said handle.

34. In a grinding machine, the combination of a reciprocable work support and a tool support mounted for cross-feed movement in a direction transverse to the path of reciprocation of said work support, first and second power actuated means for respectively reciprocating said work support and feeding said tool support forward step-by-step in timed relation to the reciprocation of the work support, size control means including first and second positive stops for intercepting the forward movement of said tool support at points corresponding respectively to the displacement of it from the work support required at initiation and termination of said tool support's forward feed by said second power actuated means, means including a manual operating handle for effecting a quick approach of said tool support into engagement with said first positive stop, and means responsive to engagement of said first positive stop by said tool support for initiating operation of said first power actuated means.

HAROLD N. SEYFERTH.